United States Patent [19]
Kurahashi et al.

[11] Patent Number: 5,937,212
[45] Date of Patent: Aug. 10, 1999

[54] IMAGE PICKUP APPARATUS

[75] Inventors: Sunao Kurahashi, Kawasaki; Shigeki Okauchi, Kodaira; Katsumi Iijima, Hachioji; Masayoshi Sekine, Tokyo; Kotaro Yano, Yokohama; Katsuhiko Mori, Kawasaki; Motohiro Ishikawa, Yokohama; Takeo Sakimura, Urayasu, all of Japan

[73] Assignee: Canon Kabushiki Kaisha, Tokyo, Japan

[21] Appl. No.: 08/969,285

[22] Filed: Nov. 13, 1997

[30] Foreign Application Priority Data

Nov. 15, 1996 [JP] Japan ................................. 8-304665
Nov. 15, 1996 [JP] Japan ................................. 8-304669

[51] Int. Cl.⁶ ................................................. G03B 37/02
[52] U.S. Cl. ........................... 396/20; 396/326; 396/332; 348/38; 348/47; 348/48
[58] Field of Search ........................ 348/42, 47, 48, 348/46, 36, 38, 39; 396/322, 324, 325, 326, 333, 20, 332

[56] References Cited

U.S. PATENT DOCUMENTS

| 4,322,741 | 3/1982 | Kawabayashi | 348/38 |
| 4,750,810 | 6/1988 | Tomlin et al. | 348/36 |
| 5,532,737 | 7/1996 | Braun | 348/36 |
| 5,646,679 | 7/1997 | Yano et al. | 348/36 |

FOREIGN PATENT DOCUMENTS 7-67020  3/1995  Japan .

*Primary Examiner*—David M. Gray
*Attorney, Agent, or Firm*—Fitzpatrick, Cella, Harper & Scinto

[57] ABSTRACT

A compound eye image pickup apparatus with reduced parallax having two optical image pickup systems wherein the cross points between entrance pupils and optical axes of the two optical image pickup systems are generally coincident.

19 Claims, 29 Drawing Sheets

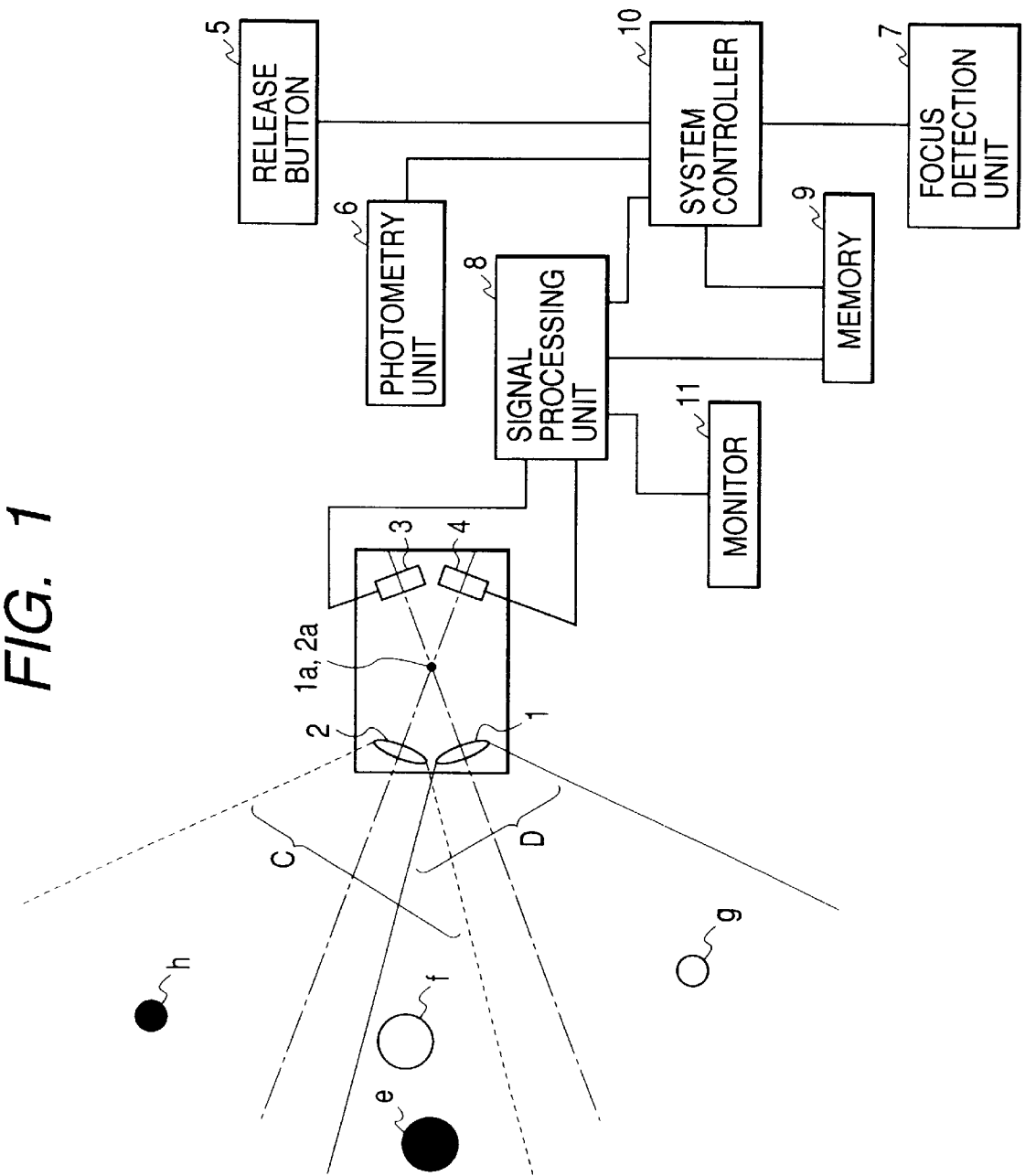

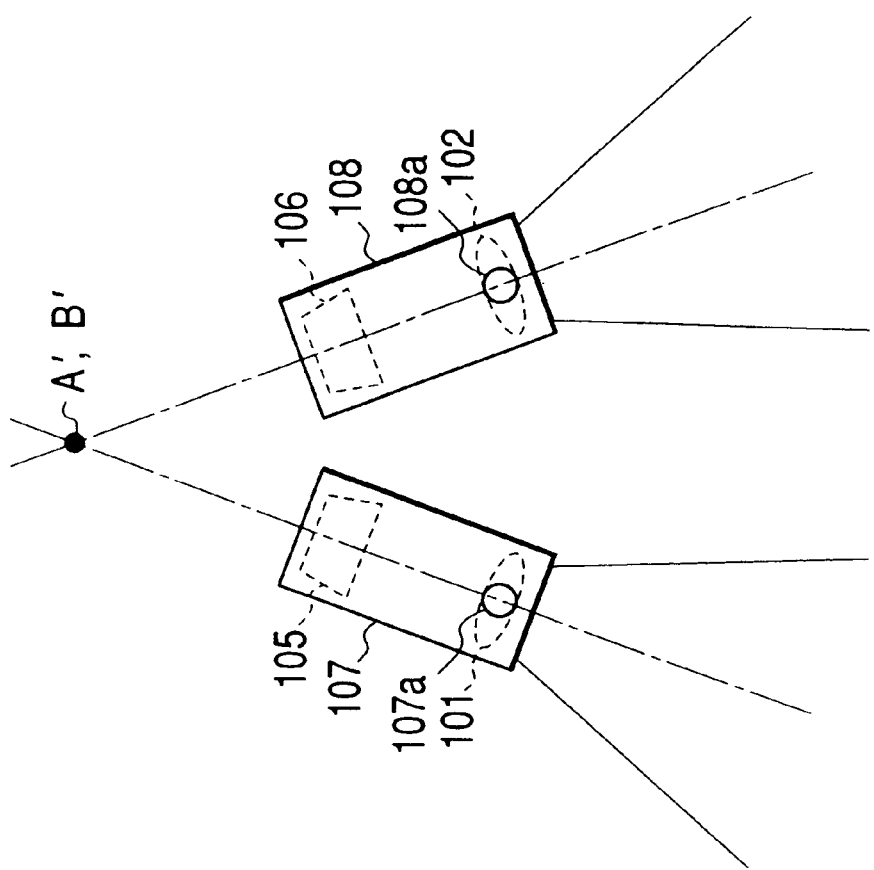
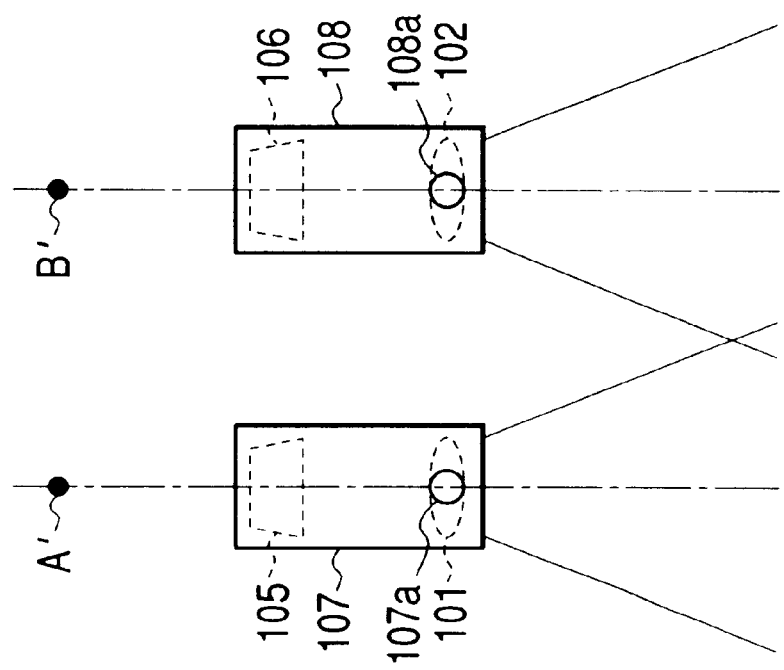
FIG. 12A
FIG. 12B

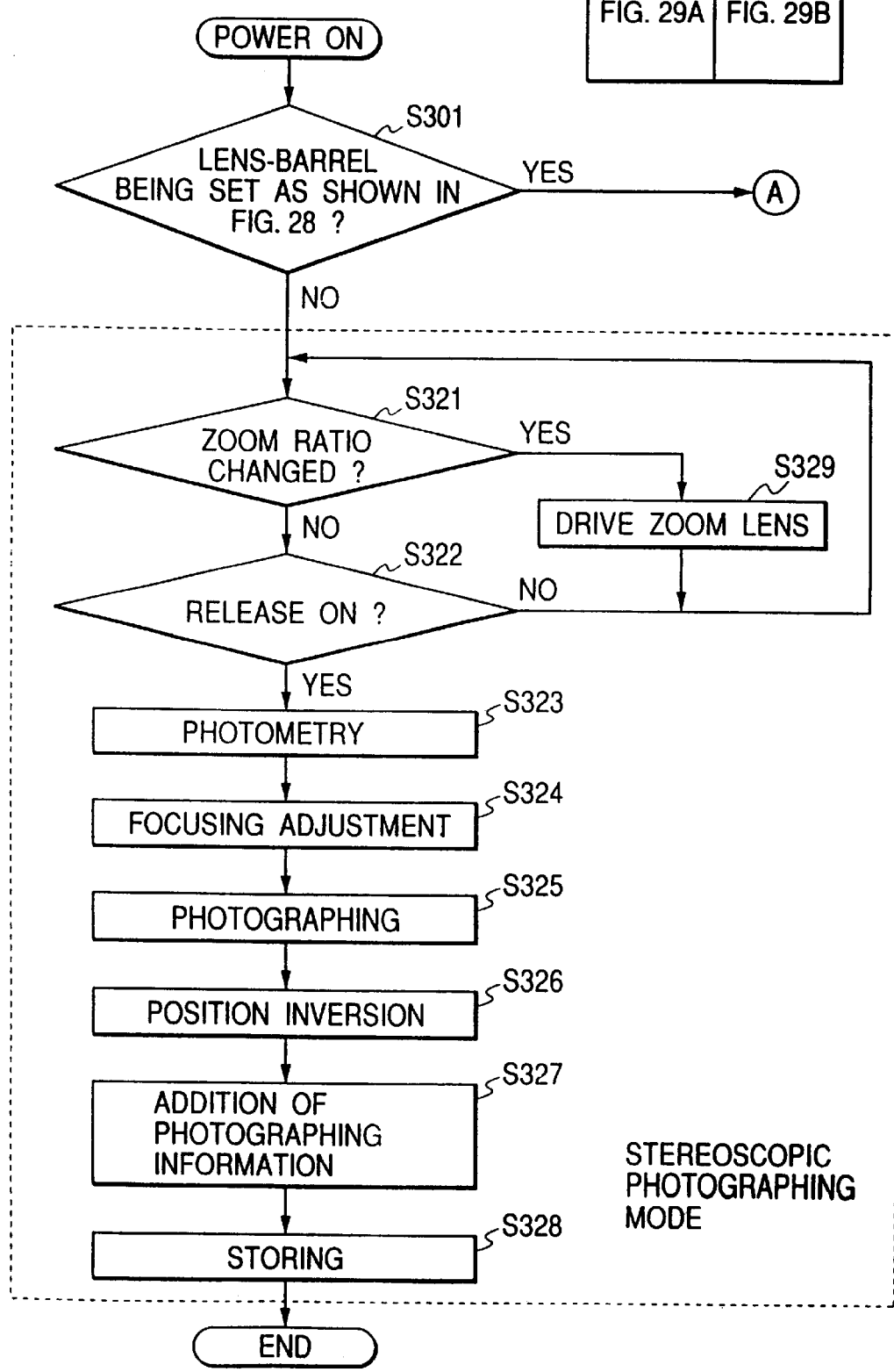

IMAGE PICKUP APPARATUS

BACKGROUND OF THE INVENTION

1. Field of the Invention

The present invention relates to an image pickup apparatus, and more particularly to an image pickup apparatus suitable for use as a compound eye image pickup apparatus.

2. Related Background Art

A compound eye image pickup apparatus has been proposed in order to form a wide panoramic image or high precision image, as disclosed, for example, in Japanese Patent Application Laid-open No. 7-67020. This compound eye image pickup apparatus has a plurality of image pickup systems each having an optical focussing system and an image pickup element, and forms a single synthesized image from image signals obtained by these image pickup devices.

Such a compound eye image pickup apparatus is, however, associated with a problem that an area of an image of a back object not picked up because of the presence of a front object differs at each image pickup element. FIGS. 14, 15A and 15B illustrate how this problem occurs. In FIG. 14, reference numerals 131 to 133 represent a spherical object, and reference numerals 134 and 135 represent an eye position from which each object is observed. FIGS. 15A and 15B show the objects 131 to 133 as viewed from the eye positions 134 and 135. As the objects 131 to 133 are viewed from the eye position 134, the object 132 is partially shaded by the object 131 as shown in FIG. 15A. In contrast, as the objects are viewed from the eye position 135, although the object 132 is not shaded by the object 132, the object 133 is completely shaded by the object 131 as shown in FIG. 15B. Therefore, even if two images with a partially overlapped area taken from different eye positions are synthesized to form a panoramic image, since the overlapped areas of the two images are not identical to each other, it is difficult to synthesize the two images such that the joint area between two overlapped areas does not become conspicuous.

There is another problem that the shape of a cubic object changes with an eye position. FIGS. 16, 17A and 17B illustrate how this problem occurs. In FIG. 16, reference numeral 156 represents an object having a cubic form, and reference numerals 157 and 158 represent an eye position. FIGS. 17A and 17B show the image of the object 156 as viewed from the different eye positions 157 and 158. As the object 156 is viewed from the eye position 157, the object has an image of generally a square as shown in FIG. 17A, whereas as the object 156 is viewed from the eye position 158, it has an image of two trapezoids having one common side as shown in FIG. 17B. Therefore, even if two images with a partially overlapped area taken from different eye positions are synthesized to form a panoramic image, since the overlapped areas of the two images have different shapes, it is impossible to synthesize the two images.

As above, a panoramic image taken with a conventional compound eye image pickup apparatus is often synthesized into an unsatisfactory image, because of the above problems caused by different image pickup positions of right and left image pickup systems. Such a difference between image pickup positions of right and left image pickup systems is hereinafter called a parallax.

SUMMARY OF THE INVENTION

It is a first object of the present invention to provide a compound eye image pickup apparatus of a simple structure having image pickup systems with scarce parallax.

It is a second object of the present invention to provide a compound eye image pickup apparatus of a simple structure having image pickup systems without any parallax.

It is a third object of the invention to provide an image pickup apparatus capable of synthesizing a cubic image without any distortion giving natural feeling and avoiding any artificial feeling.

In order to achieve the above objects, a preferred embodiment of the present invention discloses a compound eye image pickup apparatus comprising: a plurality of optical image pickup means for condensing object light and forming an optical image on a focussing plane of each image pickup element, wherein the plurality of optical image pickup means are disposed such that the cross points between entrance pupils and optical axes of the plurality of optical image pickup means are generally coincident.

Another preferred embodiment of the present invention discloses a compound eye image pickup apparatus comprising: a plurality of optical image pickup means for condensing object light via lenses and forming an optical image on a focussing plane of each image pickup element, wherein the entrance pupils of the plurality of optical image pickup means are set at positions nearer to an object than a lens nearest to the object among lenses of the plurality of optical image pickup means, and disposed such that centers of gravity of the entrance pupils or the cross points between entrance pupils and optical axes of the plurality of optical image pickup means are generally coincident.

Another preferred embodiment of the present invention discloses a compound eye image pickup apparatus comprising: a plurality of optical image pickup means for condensing object light via lenses and forming an optical image on a focussing plane of each image pickup element, the plurality of optical image pickup means being capable of having a plurality of focal lengths; moving means for moving the plurality of optical image pickup means between first and second positions, at the first position the cross points between entrance pupils and optical axes of the plurality of optical image pickup means being generally coincident, and at the second position the cross points between entrance pupils and optical axes of the plurality of optical image pickup means being not coincident; and limiting means for limiting a focal length of each of the plurality of optical image pickup means at the first position in a predetermined range.

The other objects and features of the present invention will become more apparent from the following detailed description of preferred embodiments when read in conjunction with the accompanying drawings.

BRIEF DESCRIPTION OF THE DRAWINGS

FIG. 1 is a diagram showing the structure of an image pickup apparatus according to a first embodiment of the present invention.

FIGS. 12A and 12B are schematic diagrams illustrating a driving state of a lens barrel.

DETAILED DESCRIPTION OF THE PREFERRED EMBODIMENTS

Figure 2A:
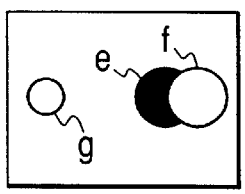
FIGS. 2A, 2B and 2C are schematic diagrams showing images of objects taken with optical image pickup systems and an image after synthesizing.

An image pickup apparatus of this invention will be described in detail with reference to its preferred embodiments.

According to a preferred embodiment of the present invention, an image pickup apparatus is disclosed wherein each of a plurality of optical image pickup means is disposed such that the focussing positions of an object point at different distances, more particularly, the positions on a photographing plane of intensity centers of gravity of light fluxes of an object point captured by an optical system, can be made unchanged in a predetermined photographing area in the common field of view of the plurality of optical image pickup means.

If aberration of each of the plurality of optical image pickup means is so large that each photographed image becomes different, the image quality becomes poor. It can be assumed, however, that aberration in a practical optical system can not affect parallax. It is therefore possible to disclose an image pickup apparatus in which the focussing positions of an object point at different positions can be made unchanged in the common field, if the centers of entrance pupils which correspond to images obtained by stops limiting the range of light fluxes incident upon an optical system, i.e., if the cross points between entrance pupils and optical axes of the plurality of optical image pickup means, are made generally coincident.

FIG. 1 is a block diagram showing the structure of a compound eye camera according to the first embodiment of the invention. In FIG. 1, reference numerals 1 and 2 represent an optical image pickup system, and reference numerals 1a and 2a represent the positions of cross points between entrance pupils and optical axes of the optical image pickup systems 1 and 2. In this embodiment, it is assumed that the object principal points are also positioned near at the cross points 1a and 2a between the entrance pupils and optical axes. Reference numerals 3 and 4 represent an image pickup element for converting an optical image focussed by each of the optical image pickup systems 1 and 2 into an electrical image signal. In the following description, the optical image pickup system 1 and its image pickup element 3 are collectively called an optical image pickup system L, and the optical image pickup system 2 and its image pickup element 4 are collectively called an optical image pickup system R. In FIG. 1, reference characters C and D represent image pickup ranges of the optical image pickup systems R and L, respectively. Reference characters e, f, g and h represent a spherical object.

Figure 2B:
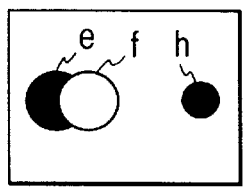

As described above, the optical axes of the optical image pickup systems 1 and 2 of the optical image pickup systems L and R are disposed crossing near at the entrance pupils. Therefore, there is no parallax between the images taken with the optical image pickup systems L and R as opposed to the case described previously. In this case, the images of the objects e, f, g and h taken with the optical image pickup systems L and R become as shown in FIGS. 2A and 2B. As seen from FIGS. 2A and 2B, the areas taken in duplicate with the optical image pickup systems L and R have the same objects. It is therefore easy to form a panoramic image by synthesizing the two images with the overlapped areas shown in FIGS. 2A and 2B being superposed one upon the other.

Reverting back to FIG. 1, reference numeral 5 represents a release button for generating a release signal upon the actuation thereof. Reference numeral 6 represents a photometry unit for measuring a brightness of an object. Reference numeral 7 represents a focus detection unit for detecting an in-focus state of the optical image pickup systems L and R. Reference numeral 8 represents a signal processing unit for synthesizing two sets of image data obtained by the image pickup elements 3 and 4 and converting the synthesized image data into a predetermined image signal. Reference numeral 9 represents a memory for storing image data supplied from the signal processing unit 8 or other data. Reference numeral 10 represents a system controller for controlling the entirety of the compound eye camera. Reference numeral 11 represents a monitor for displaying image signals obtained by the signal processing unit 8.

Figure 3:
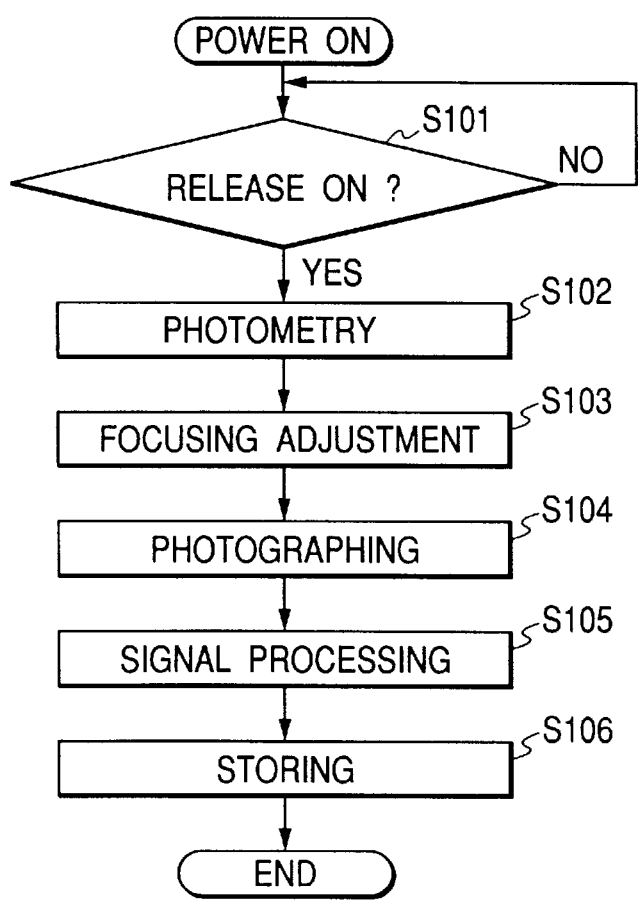
FIG. 3 is a flow chart illustrating a photographing operation.

Next, the operation of the compound eye camera will be described. FIG. 3 is a flow chart illustrating the operation of the compound eye camera shown in FIG. 1. The operations are assumed to be controlled by the system controller 10, unless otherwise specifically described. In FIG. 3, when a power switch (not shown) of the compound eye camera is turned on, the operation mode enters a photographing standby state (Step S101). As the release button 5 is activated at Step S101 and a release signal is generated, the brightness of an object is measured with the photometry unit 6 and in accordance with this photometric value, a stop value and a shutter speed are determined (Step S102). Next, the focus detection unit 7 adjusts the optical image pickup systems L and R to focus the object (Step S103). Next, in accordance with the stop value and shutter speed determined at Step S102, the image pickup elements 3 and 4 are exposed (Step S104). Signals obtained by the image pickup elements 3 and 4 are processed by the signal processing unit 8 in accordance with each photographing mode (Step S105). The signal processing unit 8 performs trapezium distortion correction prior to synthesizing two image signals obtained by the optical image pickup systems L and R into one continuous image signal.

Figure 4:
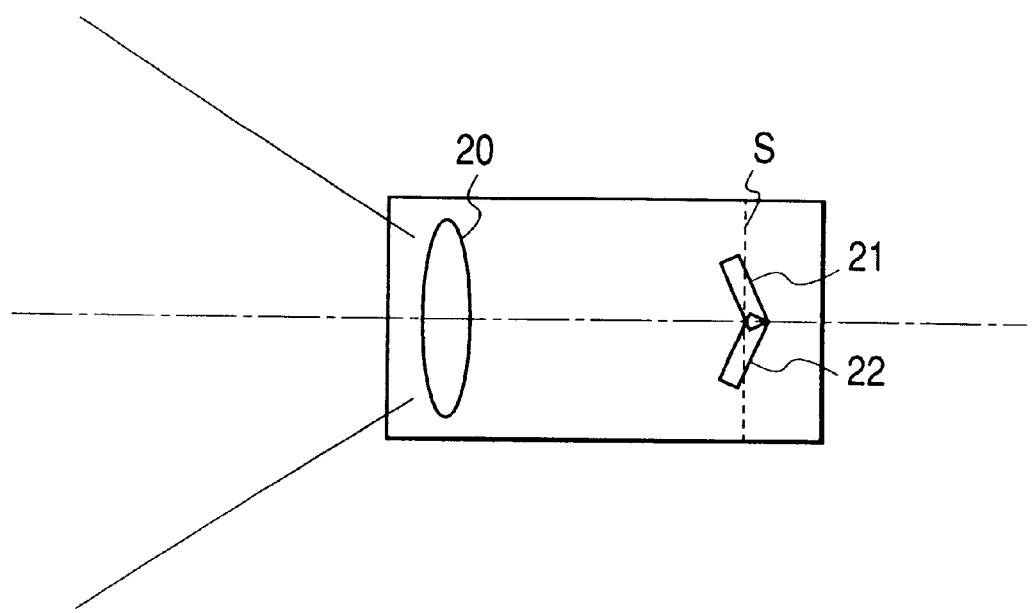
FIG. 4 is a schematic diagram illustrating the principle of trapezium distortion.

The trapezium distortion will be described. FIG. 4 shows an optical image pickup system equivalent to the optical image pickup systems L and R shown in FIG. 1. Reference numeral 20 represents a taking lens, and reference numerals 21 and 22 represent an image pickup element. As seen from FIG. 4, the image pickup elements 21 and 22 are slanted relative to the optical axis of the taking lens 20 having an angle of view of the image pickup range equivalent to the optical image pickup systems L and R shown in FIG. 1, in correspondence with a cross angle between the optical axes of the optical image pickup systems L and R. In this embodiment, as described previously, the optical axes of the optical image pickup systems L and R cross at a predetermined angle, and these systems are slanted relative to the center object. Therefore, an image focussed with the taking lens 20 does not coincide with an image focussed on one plane indicated by a broken line S, but becomes a distorted image. This distortion is the trapezium distortion. In this embodiment, this trapezium distortion is corrected so that images taken with the optical image pickup systems L and R become equivalent to an image focussed on one plane by the taking lens 20 shown in FIG. 4 having the same image pickup range as the optical image pickup systems L and R.

Figure 2C:
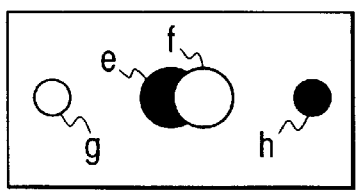

Reverting back to FIG. 3, the signal processing unit 8 extracts corresponding points of two overlapped image portions of two image signals with corrected trapezium distortions, and obtains an overlap amount of the two image signals in accordance with the corresponding points. The two image signals are synthesized according to the obtained overlap amount to provide a video signal representing one panoramic image such as shown in FIG. 2C. The image signal processed by the signal processing unit 8 in the above manner is stored in the memory 9 (Step S106). The above operations complete a single photographing sequence. The image signal stored in the memory 9 can be reproduced on the monitor 11 by activating an unrepresented reproduction button to make the compound eye camera enable to reproduce.

In this embodiment, two optical image pickup systems are used. The invention is not limited to this embodiment, but is applicable to other compound eye image pickup apparatuses having three or more optical image pickup systems if at least one pair thereof is configured in the manner similar to this embodiment. Furthermore, since the cross points between entrance pupils and optical axes of the optical image pickup systems of this embodiment are positioned near at the object principal points, these principal points may be set generally at the same position, with the similar effects as above being expected.

Figure 5:
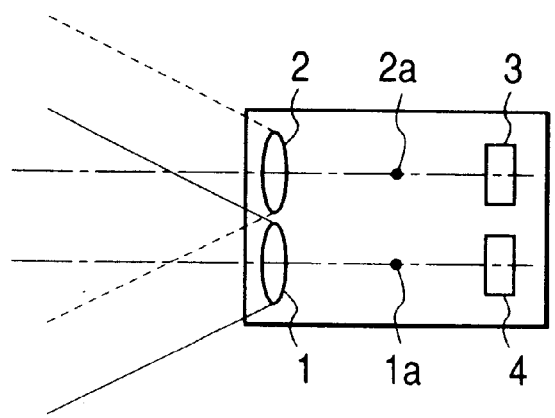
FIG. 5 is a schematic diagram illustrating the structure of a compound eye camera unit.

Still further, as shown in FIG. 5, taking lenses 1 and 2 and image pickup elements 3 and 4 may be mounted rotatively so that cross points 1a and 2a between entrance pupils and optical axes of the taking lenses 1 and 2 do not coincide. In the state shown in FIG. 5, the taking lens 1 focusses upon the image pickup element 4, whereas the taking lens 2 focusses upon the image pickup element 3, and the optical axes of the taking lenses 1 and 2 are generally parallel. Image signals taken in this state have parallax so that a so-called stereoscopic image can be reproduced from these image signals.

In the second embodiment of this invention, a panoramic image is synthesized by calculating the relative position of one of the two images in accordance with a relative image pickup angle, focal length and the like of optical image pickup systems L and R. In this case, the following advantages can be obtained.

(1) Since corresponding points are not extracted, the structure of a signal processing unit can be simplified and an image synthesizing time can be shortened.

(2) Since the overlap amount of two images can be made nearly zero, a wider panoramic image can be formed.

Figure 6:
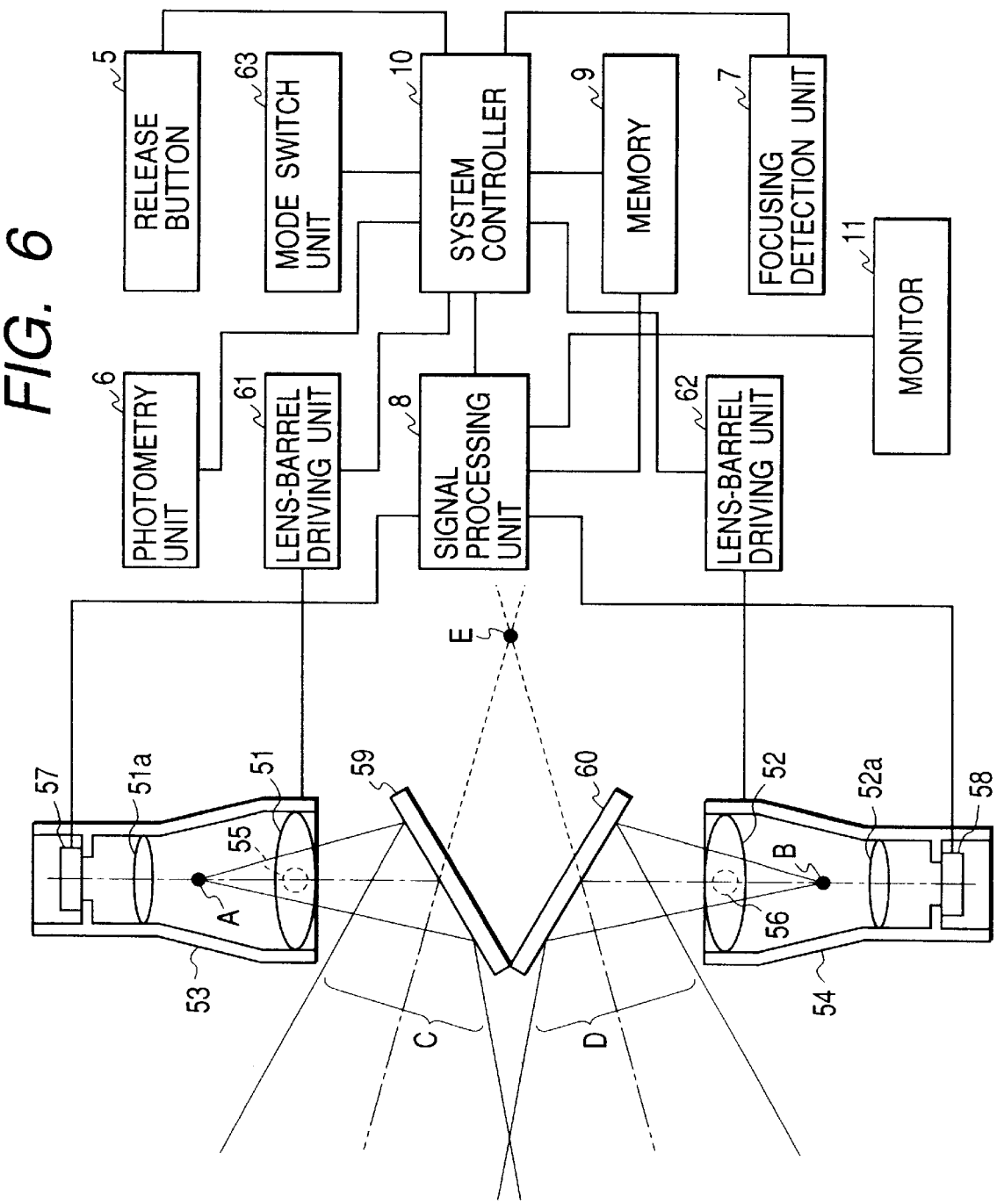
FIG. 6 is a diagram showing the structure of an image pickup apparatus according to a third embodiment of the present invention.

FIG. 6 is a schematic diagram partially in block form showing the structure of a compound eye image pickup apparatus according to the third embodiment of the invention. In FIG. 6, reference numerals 5 to 11 represent an element substantially equal to the element shown in FIG. 1 having the identical reference numerals, and so the description thereof is omitted. Reference numerals 51 and 52 represent a taking lens. Reference numerals 51a and 52a represent a focussing lens capable of being moved along an optical axis by an unrepresented focus adjustment mechanism. Reference numerals 53 and 54 represent lens barrels for fixing the taking lenses 51 and 52 and focussing lenses 51a and 52a, the lens barrels being fixed to a camera main body and rotatable about shafts 55 and 56. Reference numerals 57 and 58 represent image pickup elements fixed to the lens barrels 53 and 54 for converting optical images focussed with the taking lenses 51 and 52 into electrical image signals. Reference numerals 59 and 60 represent reflection mirrors disposed in front of the taking lenses 51 and 52 for introducing object light fluxes to the taking lenses 51 and 52. The structure constituted of the above elements is collectively called a compound eye camera unit hereinafter. In this embodiment, since the compound eye camera unit is constructed in the above manner, this unit can be made thin in the photographing direction.

Reference characters A and B represent the positions of cross points between entrance pupils and optical axes of the taking lenses 51 and 52, and reference characters C and D represent photographing light fluxes of the taking lenses 51 and 52. Reference character E represents a symmetrical position, i.e., imaginary image position of the cross points A and B between the entrance pupils and optical axes of the taking lenses 51 and 52, relative to the reflection plane of the reflection mirrors 59 and 60. Namely, in the state shown in FIG. 6, the taking lenses 51 and 52 are equivalent to those lenses which take images in the image pickup ranges C and D, with the cross points A and B between the entrance pupils and optical axes being made coincident with the imaginary image position by the reflection mirrors 59 and 60, and the cross points A and B between the entrance pupils and optical axes of the taking lenses 51 and 52 are coincident. Therefore, images taken with the taking lenses 51 and 52 have no parallax such as described above.

Reference numerals 61 and 62 represent lens barrel driving units for rotating the lens barrels 53 and 54 about their shafts 55 and 56. Reference numeral 63 represents a mode switch unit for switching between a panoramic photographing mode and a stereoscopic photographing mode. In the panoramic photographing mode, an image long in a lateral direction is formed by joining together two images of an object without a different image portion which is caused by a position difference of the taking lenses 51 and 52. In the stereoscopic photographing mode, a stereoscopic image is formed from two images of an object with a different image portion which is caused by a position difference of the taking lenses 51 and 52. The principle of synthesizing images in the panoramic photographing mode has been described in the first embodiment, and so the description thereof is omitted herein.

Figure 7:
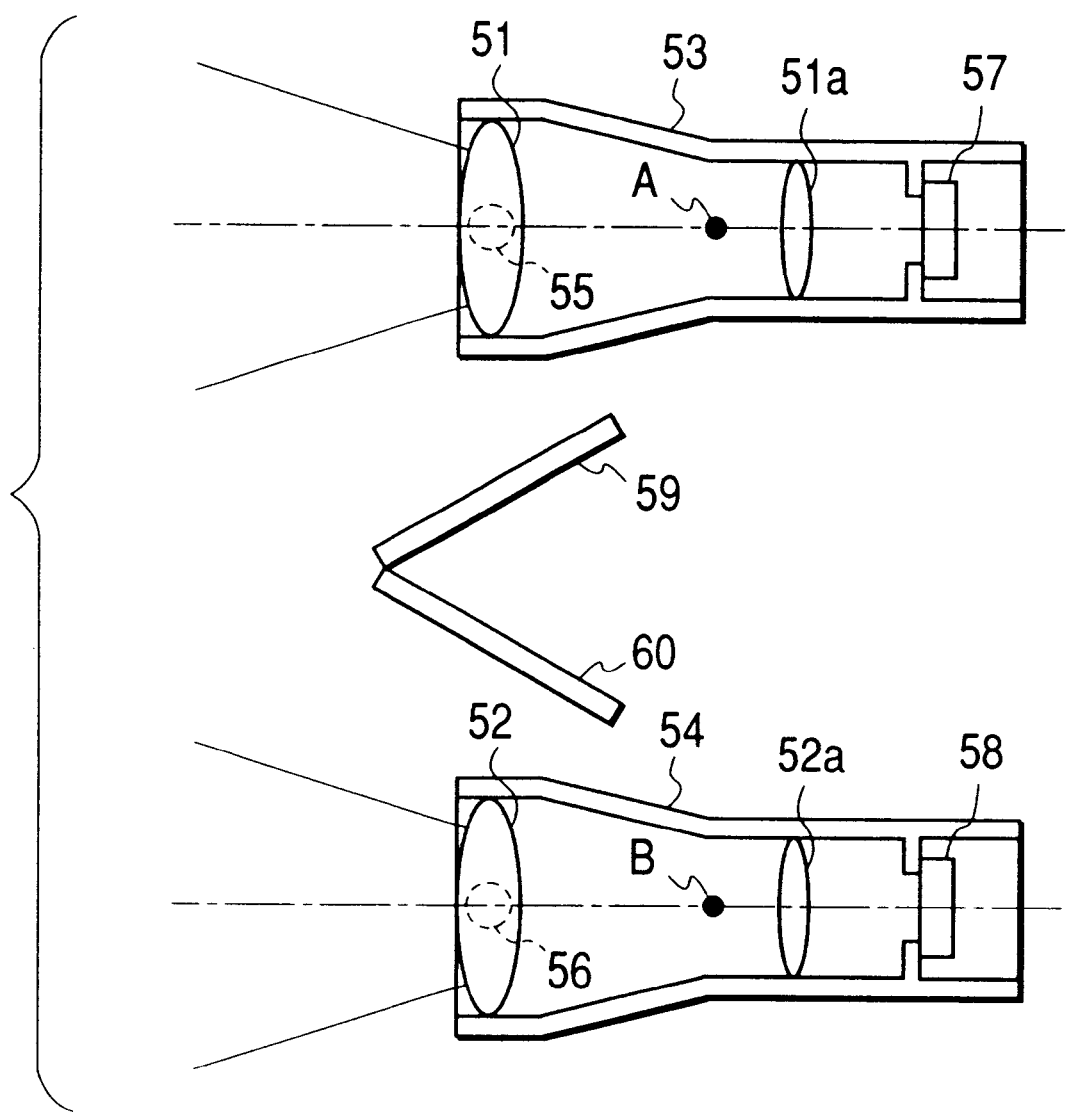
FIG. 7 is a schematic diagram illustrating stereoscopic photographing.

FIG. 7 is a schematic diagram illustrating the stereoscopic photographing mode to be performed by the compound eye camera unit. The optical axes of the optical image pickup systems are generally parallel, and the positions of the cross points A and B between the entrance pupils and optical axes of the taking lenses 51 and 52 are different. Therefore, if an image of an object taken from the left is reproduced to be visible only by the left eye of a viewer and that taken from the right is reproduced to be visible only by the right eye, a so-called stereoscopic image of the object can be reproduced.

Figure 8:
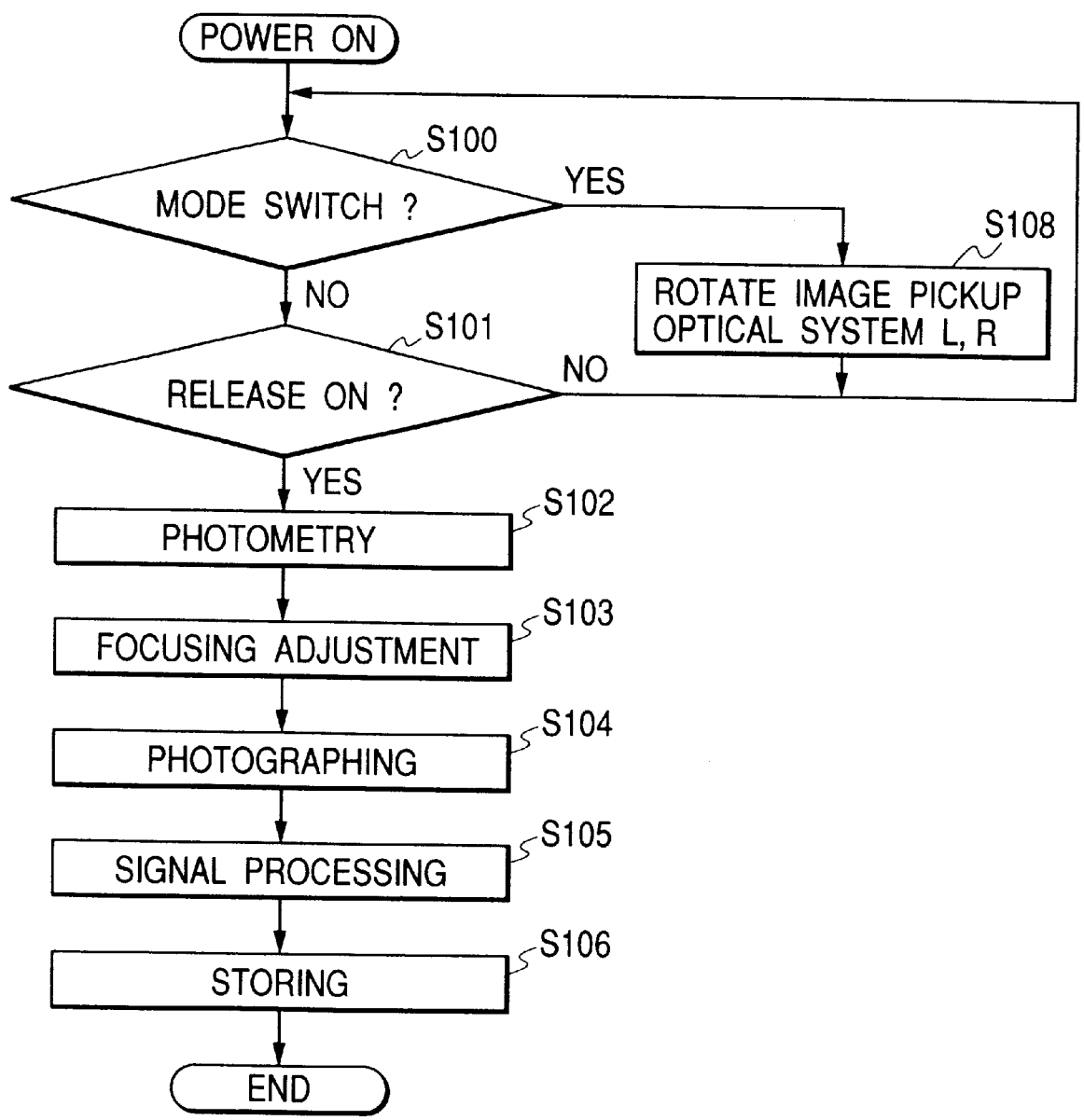
FIG. 8 is a flow chart illustrating a photographing operation.

Next, the operation of the compound eye image pickup apparatus will be described. FIG. 8 is a flow chart illustrating the operation of the compound eye image pickup apparatus shown in FIG. 6. The operations are assumed to be controlled by the system controller 10, unless otherwise specifically described. In FIG. 8, when a power switch (not shown) of the compound eye camera is turned on, the operation mode enters a photographing standby state (Steps S100, S101). In this photographing standby state, the photographing mode can be switched (Step S100) to Step S108 by operating the mode switch unit 63. At Step S108, the lens barrels are rotated about the shafts 55 and 56 to take the state shown in FIGS. 6 or 7 in accordance the switched photographing mode.

As the release button 5 is activated at Step S101 and a release signal is generated, the processes substantially the same as those shown in FIG. 3 are performed at Steps S102 to S106, and image signals processed by the signal processing unit 8 are stored in the memory 9. If the images of the object are out of focus at Step S103, the focus adjustment mechanism adjusts the focus of the images by moving the focussing lenses 51a and 52a in the optical axis direction. In the stereoscopic photographing mode, the signal processing unit 8 converts the signals obtained by the image pickup elements 57 and 58 into predetermined image signals which are added with information such as a photographing mode signal, an identification signal representing a pair of image signals, and a photographing condition signal. In the panoramic photographing mode, the signal processing unit 8 inverts the right and left signals, cancels out mirror images of the reflection mirrors 59 and 60, converts them into predetermined image signals, and corrects trapezium distortion in the manner similar to the first embodiment.

The image signals of an elongated image generated by the signal processing unit 8 such as shown in FIG. 2C are stored in the memory 9. The image signals can be reproduced on the monitor 11 upon activation of an unrepresented reproduction button.

This embodiment provides the following advantages.

(1) The directions of photographing light fluxes incident upon the taking lenses 51 and 52 are changed by the reflection mirrors 59 and 60. Therefore, the structure of the apparatus can be simplified.

(2) The moving part when the photographing mode is switched is only the lens barrels 53 and 54 which fix the taking lenses 51 and 52, focussing lenses 51a and 52a and image pickup elements 57 and 58. Therefore, the structure of the apparatus can be simplified.

Figure 9:
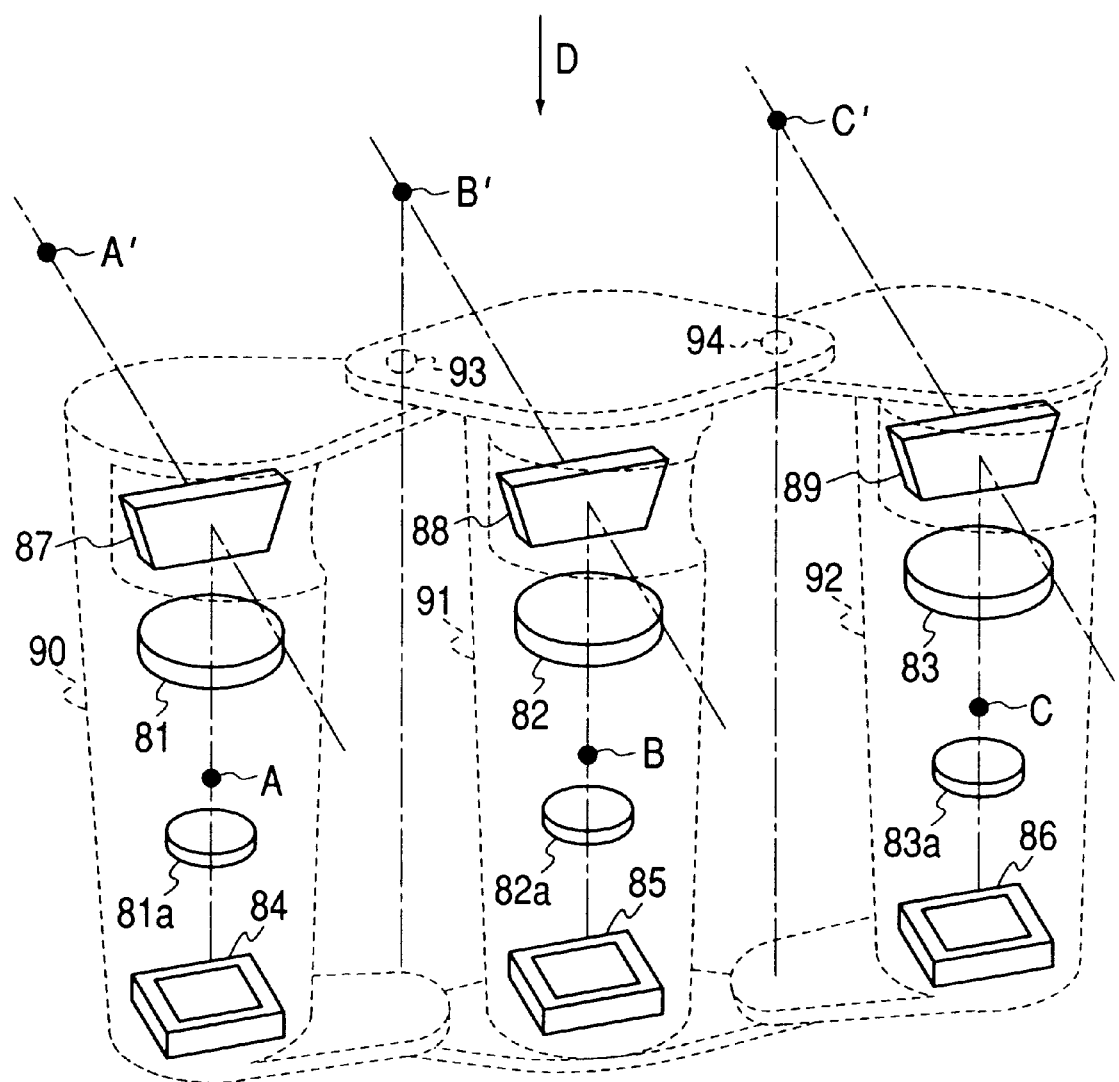
FIG. 9 is a diagram showing the structure of an image pickup apparatus according to a fourth embodiment of the present invention.
Figure 10A:
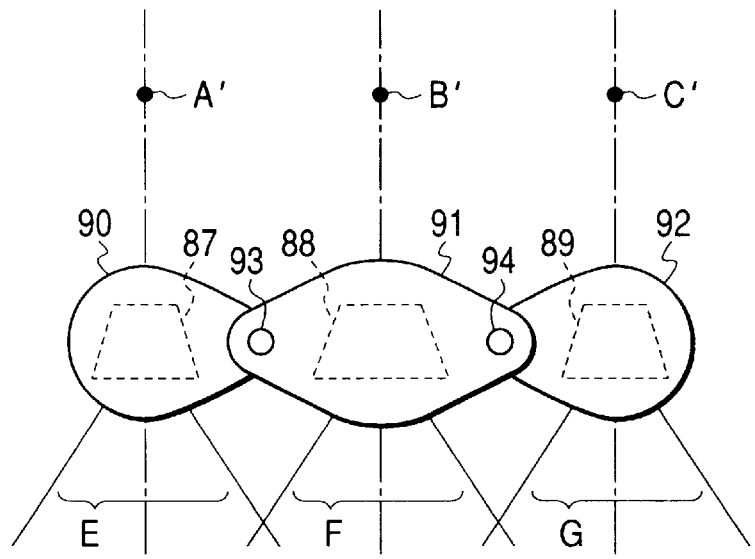
FIGS. 10A and 10B are schematic diagrams illustrating a driving state of a lens barrel.
Figure 10B:
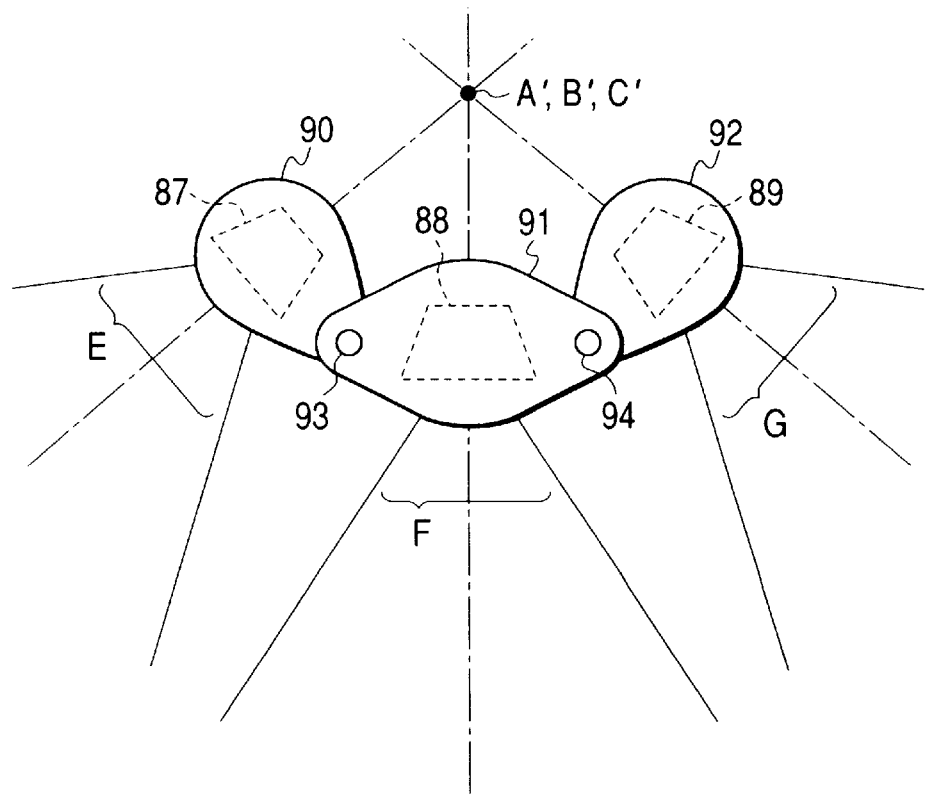

FIG. 9 and FIGS. 10A and 10B are schematic diagrams showing the structure of a compound eye camera unit of a compound eye image pickup apparatus according to the fourth embodiment of the invention. In these Figures, reference numerals 81, 82 and 83 represent a taking lens. Reference numerals 81a, 82a and 83a represent a focussing lens capable of being moved along an optical axis by an unrepresented focus adjustment mechanism. Reference numerals 84, 85 and 86 represent an image pickup element. Reference numerals 87, 88 and 89 represent a reflection mirror. Reference numerals 90, 91 and 92 represent lens barrels for fixing the taking lenses 81 to 83, image pickup elements 84 to 86 and reflection mirrors 87 to 89. The lens barrels 90 and 92 are supported by the lens barrel 91 to be rotatable about rotary shafts 93 and 94. Reference characters A, B and C represent the positions of cross points between entrance pupils and optical axes of the taking lenses 81 to 83, and reference characters A', B' and C' represent symmetrical positions, i.e., imaginary image positions of the cross points A to C between the entrance pupils and optical axes of the taking lenses 81 to 83, relative to the reflection plane of the reflection mirrors 87 to 89.

FIGS. 10A and 10B are diagrams showing the compound camera unit shown in FIG. 9 as viewed along an arrow D. In FIGS. 10A and 10B, reference characters E, F and G represent photographing light fluxes of the taking lens 81 to 83. The state shown in FIG. 10A illustrates the stereoscopic photographing mode in which the imaginary image points of object principal points of the taking lenses 81 to 83 are not coincident with each other. The state shown in FIG. 10B illustrates the panoramic photographing mode of the compound camera unit. As shown, the lens barrels 90 and 92 rotate about the shafts 93 and 94, and the imaginary image positions A' and C' of the cross points between the entrance pupils and optical axes of the taking lenses 81 and 83 converge to one point at the imaginary image position B' of the cross point between the entrance pupil and optical axis of the taking lens 82. Since the images taken at the respective lens barrels have no parallax, a panoramic image synthesis is possible.

The operation is generally the same as the third embodiment, and so the description thereof is omitted.

This embodiment provides the following advantages.

(1) The directions of photographing light fluxes incident upon the object lenses 81 to 83 are changed by the reflection mirrors 87 to 89. Therefore, the structure of the apparatus can be simplified.

(2) Since the lens barrels 90 to 92 holding the optical image pickup systems are coupled together to enable relative motions, the structure of motion mechanisms of the optical image pickup systems to be used when the photographing mode is changed can be simplified.

In this embodiment, although the cross points between the entrance pupils and optical axes of the three optical image pickup systems are made coincident with each other, other optical image pickup systems may be used. In this case, wider, 360° at a maximum, panoramic photographing becomes possible.

Figure 11:
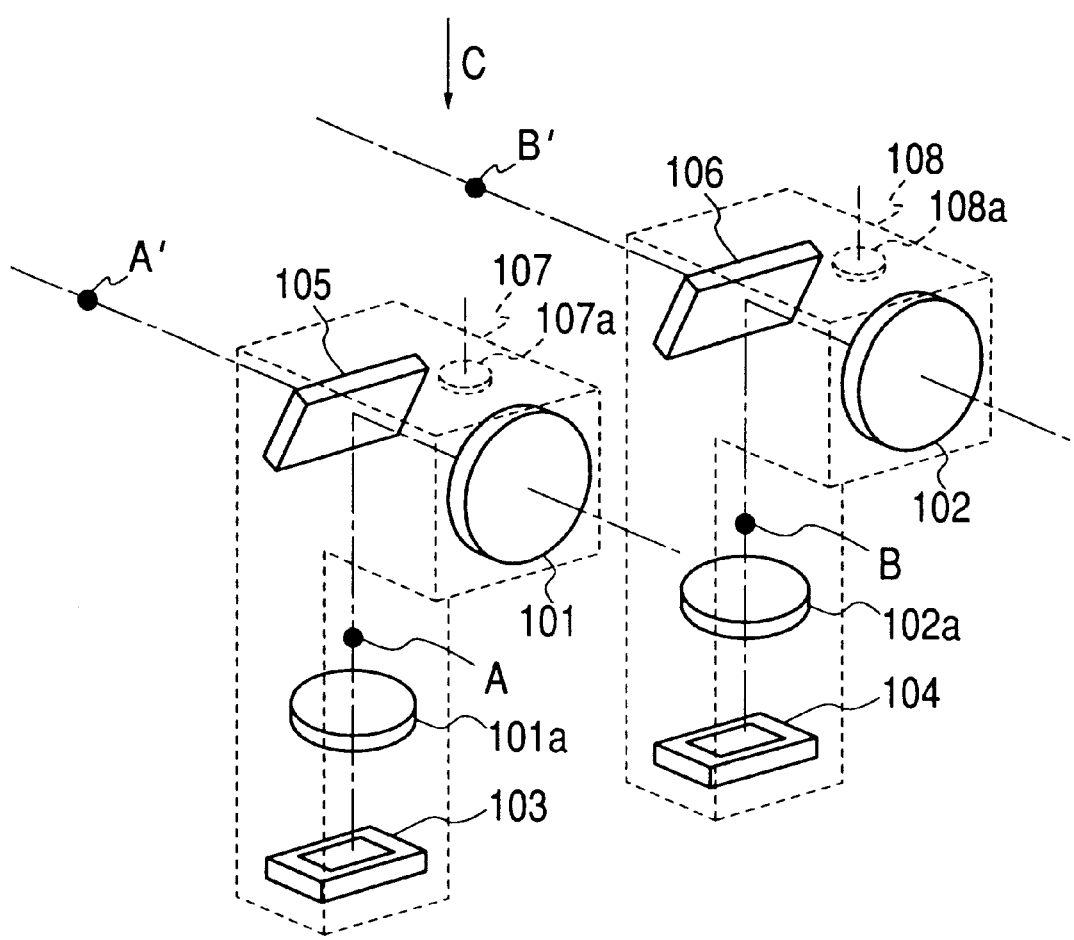
FIG. 11 is a diagram showing the structure of an image pickup apparatus according to a fifth embodiment of the present invention.

FIG. 11 and FIGS. 12A and 12B are schematic diagrams showing the structure of a compound eye camera unit of a compound eye image pickup apparatus according to the fifth embodiment of the invention. In these Figures, reference numerals 101 and 102 represent a taking lens. Reference numerals 101a and 102a represent a focussing lens capable of being moved along an optical axis by an unrepresented focus adjustment mechanism. Reference numerals 103 and 104 represent an image pickup element. Reference numerals 105 and 106 represent a reflection mirror. Reference numerals 107 and 108 represent lens barrels for fixing the taking lenses 101 and 102, image pickup elements 103 and 104 and reflection mirrors 105 and 106. The lens barrels 107 and 108 are fixed to an unrepresented camera main body and rotatable about shafts 107a and 108a. Reference characters A and B represent the positions of cross points between entrance pupils and optical axes of the taking lenses 101 and 102, and reference characters A' and B' represent symmetrical positions, i.e., imaginary image positions of the cross points A and B between the entrance pupils and optical axes of the taking lenses 101 and 102, relative to the reflection plane of the reflection mirrors 105 and 106.

FIGS. 12A and 12B are diagrams showing the compound camera unit shown in FIG. 11 as viewed along an arrow C. As seen from these Figures, photographing light fluxes of the taking lenses 101 and 102 are generally parallel, and the imaginary image positions A' and B' of the cross points between the entrance pupils and optical axes are spaced apart by a predetermined distance. As described with the first embodiment, this state is the stereoscopic photographing mode. The state shown in FIG. 12B shows the state of FIG. 12A with the lens barrels 107 and 108 being rotated about the shafts 107a and 108a. As seen from FIG. 12B, the imaginary image positions A' and B' of the cross points between the entrance pupils and optical axes of the taking lenses 101 and 102 are superposed one upon the other. Therefore, as described with the first embodiment, since the images focussed upon the image pickup elements 103 and 104 have no parallax, a panoramic image synthesis is possible.

In this embodiment, the directions of photographing light fluxes are changed by the reflection mirrors 105 and 106. The structure of the apparatus can therefore be simplified.

Figure 13:
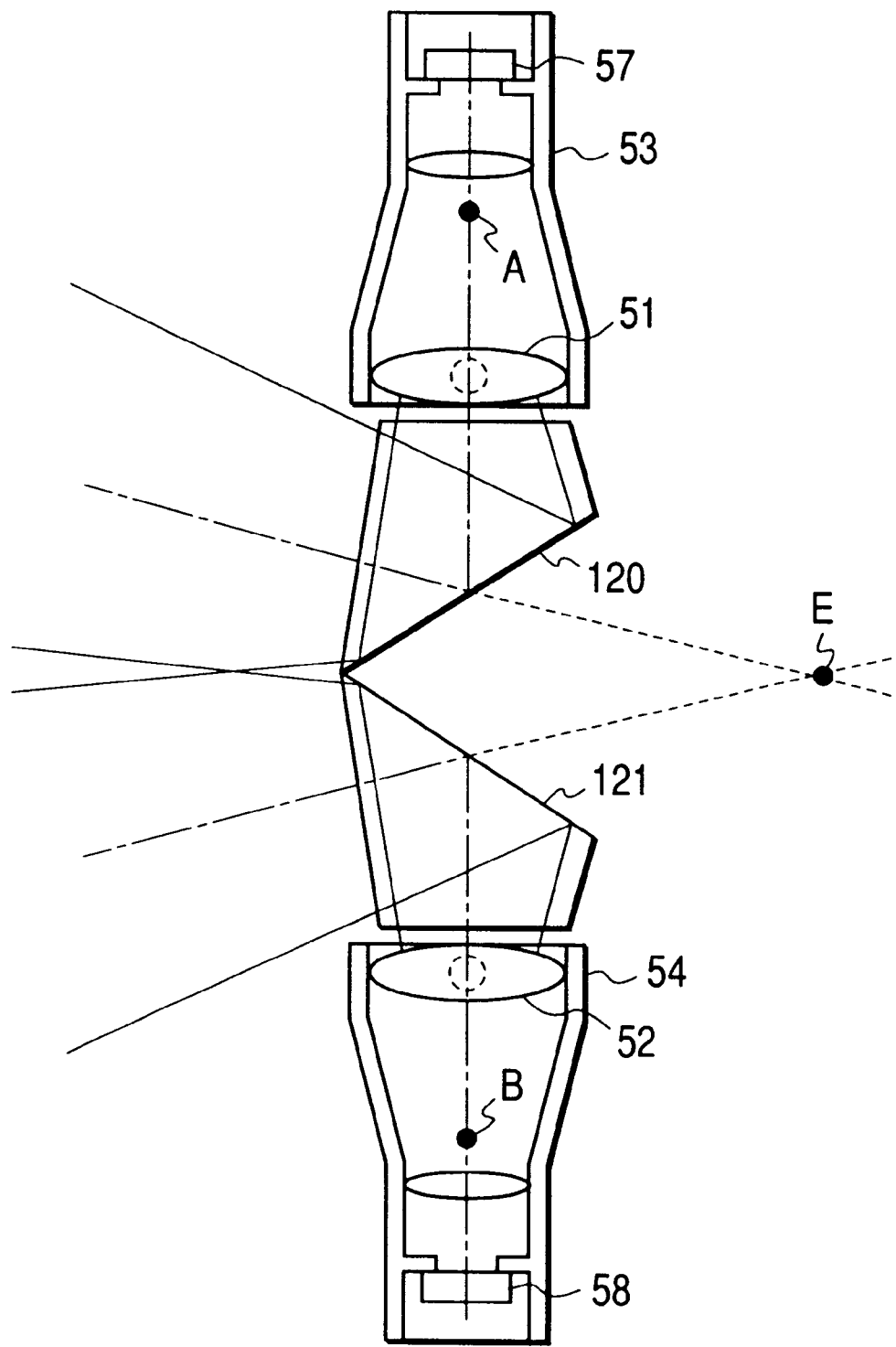
FIG. 13 is a schematic diagram of a prism used as optical path changing means.
Figure 14:
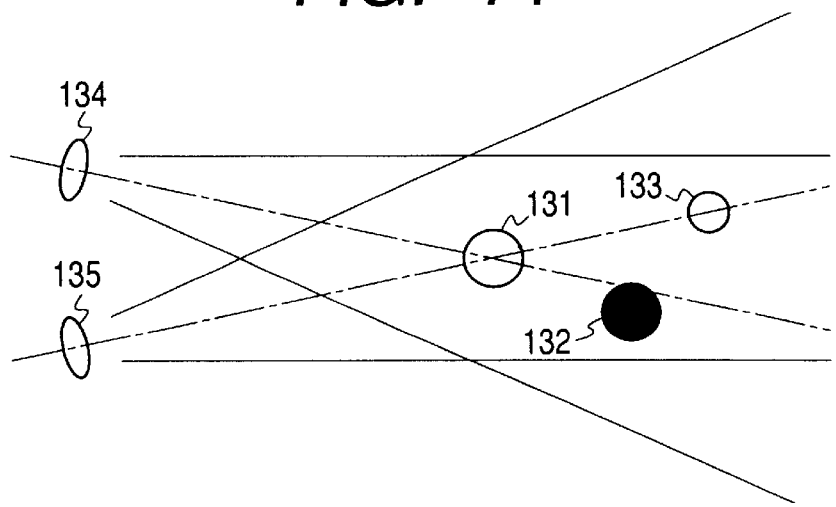
FIG. 14 is a schematic diagram showing the relationship between objects and eye positions.
Figure 15A:
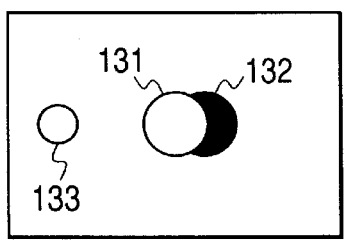
FIGS. 15A and 15B are schematic diagrams showing the images of the objects as viewed from the eye positions shown in FIG. 14.
Figure 15B:
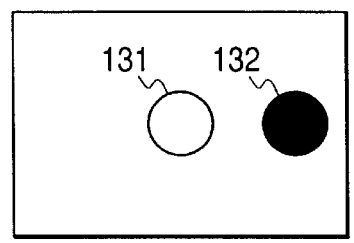
Figure 16:
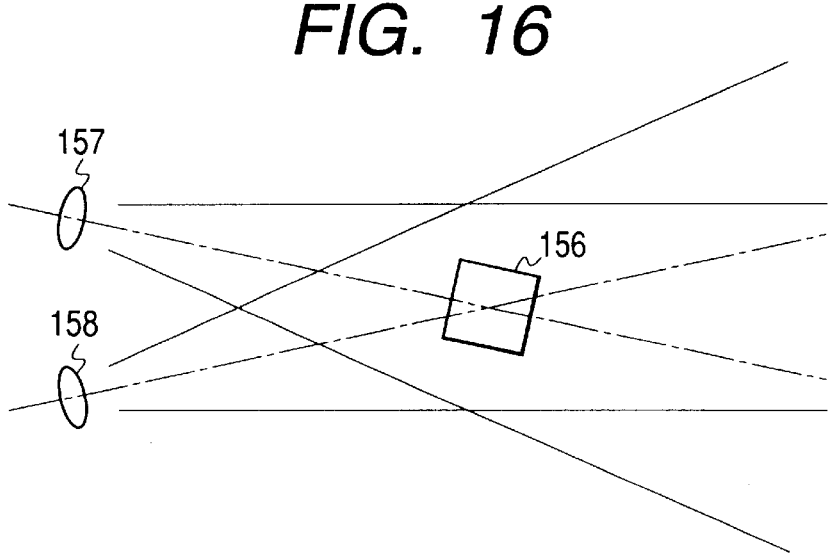
FIG. 16 is a schematic diagram showing the relationship between objects and eye positions.
Figure 17A:
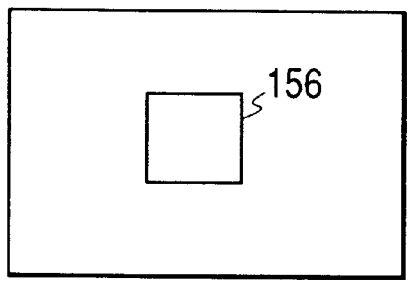
FIGS. 17A and 17B are schematic diagrams showing the images of the objects as viewed from the eye positions shown in FIG. 16.
Figure 17B:
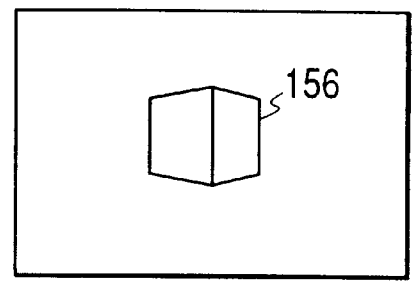

In the third to fifth embodiments, although the reflection mirrors are used as means for changing the optical path of photographing light fluxes, the invention is not limited only to the reflection mirrors. For example, as shown in FIG. 13, prisms may be used. FIG. 13 shows prisms 120 and 121 replaced by the reflection mirrors 59 and 60 of the compound eye camera unit of the third embodiment. Obviously, prisms may be used in other embodiments. Optical fibers used for endoscopes or the like may also be used as the optical path changing means.

In the first to fifth embodiments, since aberration of the first and second optical image pickup systems is sufficiently small, the cross points between the entrance pupils and optical axes are made coincident. However, if aberration or the like of the optical image pickup systems is large, parallax cannot be removed even if the cross points between the entrance pupils and optical axes are made coincident. Although the cross points between the entrance pupils and optical axes can be made coincident from the viewpoint of designs, it is practically difficult to confirm such coincidence.

In such a case, two optical systems may be disposed such that focus positions of an object point at the center of the common field of view of the optical systems become coincident both at the farthest and nearest distances in the photographing distance range. With this arrangement, it is obvious that the optical axes of the first and second optical image pickup systems intersect near at the cross points between the entrance pupils and optical axes. In this case, the following advantages can be provided.

(1) Since the object point at the center of the common field of view is used, a difference between photographed images at the most distinctive point of a synthesized image to be caused by a difference between photographing positions can be minimized. In addition, a maximum value of parallax in the common field of view can be minimized so that a best synthesized image can be formed.

(2) Since the focus positions are made coincident both at the farthest and nearest positions in the photographing distance range, parallax can be minimized over the whole photographing distance range.

As described so far, according to the above embodiments, the cross points between entrance pupils and optical axes of a plurality of optical image pickup systems are made generally coincident. Accordingly, parallax is hardly generated in the images taken with respective optical image pickup systems, and therefore it is easy to synthesize images.

Furthermore, the provision of optical path changing means allows the image positions of the cross points between entrance pupils and optical axes to be generally coincident. Accordingly, it is possible to provide a compound eye image pickup apparatus of simple structure with less physical restrictions such as interference between respective optical image pickup means and with scarce parallax of images taken with respective optical image pickup means.

Further, the plurality of optical image pickup means are made movable between first and second positions, at the first position the cross points between entrance pupils and optical axes of the plurality of optical image pickup means or the image positions of the cross points between entrance pupils and optical axes of the plurality of optical image pickup means changed by the optical path changing means being generally coincident, and at the second position the cross points between entrance pupils and optical axes of the plurality of optical image pickup means or the image positions of the cross points between entrance pupils and optical axes of the plurality of optical image pickup means changed by the optical path changing means being separated by a predetermined distance. Accordingly, it is possible to form different images, a panoramic image formed by the plurality of optical image pickup means at the first position and a stereoscopic image formed by the plurality of optical image pickup means at the second position.

Still further, the provision of image synthesizing means for synthesizing a plurality set of image data into one continuous set of image data, the plurality set of image data being picked up with the plurality of optical image pickup means set at the first position, allows to reproduce a photographed image immediately after the photographing.

Still further, the provision of image synthesizing means for generating a stereoscopic image signal from a plurality set of image data picked up with the plurality of optical image pickup means set at the second position, allows to form a stereoscopic image and in addition to form a desired image if a user moves the plurality of optical image pickup means either to the first or second position.

Still further, the provision of a mirror or a prism as the optical path changing means allows the image positions of the cross points between entrance pupils and optical axes of the plurality of optical image pickup means to become coincident by using simple structure.

Still further, if the optical path changing means is set between the image pickup element and a lens nearest to an object among lenses of each of the plurality of optical image pickup means, the optical path means can be made compact.

Still further, if the optical path changing means reflects or refracts a photographing light flux incident upon each of the plurality of optical image pickup means in a direction generally perpendicular to the disposal direction of the plurality of optical image pickup means, the plurality of optical image pickup means do not protrude greatly in the disposal direction. It is therefore possible to make the compound eye image pickup apparatus compact in the disposal direction. It is also possible to dispose the plurality of optical image pickup means such that the cross points between the entrance pupils and optical axes can be made coincident.

Still further, if trapezium distortion to be generated from a different center of one continuous set of synthesized image data is corrected, a natural image without distortion can be formed.

Next, the sixth to eleventh embodiments of the present invention will be described.

In order to solve the problem of parallax, two optical systems are disposed such that the relationship between the focussing positions of an object point at different distances (more particularly, the positions on a photographing plane of intensity centers of gravity of light fluxes of an object point captured by optical systems), can be made unchanged in a predetermined photographing area in the common field of view of the two optical systems. In this case, if aberration of each of the two optical systems is so large that each photographed image becomes different, the image quality becomes poor. It can be assumed, however, that aberration in a practical optical system can not affect parallax. It is therefore possible to make the focussing positions of an object point at different positions unchanged in the common field, if the centers of entrance pupils which correspond to images obtained by stops limiting the range of light fluxes incident upon the optical systems are made generally coincident.

If the positions of an entrance pupil of each optical system and an object principal point are near to each other, it is possible to make the focussing positions of an object point at different positions unchanged in the common field, if one optical system is disposed such that the object principal points at different positions are made generally coincident.

From the above considerations, the problem of parallax can be solved by making generally coincident the centers of entrance pupils of the two optical image pickup means, i.e., the intensity centers of gravity of the entrance pupils or the cross points between the entrance pupils and optical axes. The entrance pupil is generally present at the position nearer to the focussing plane than the lens nearest to the object among lenses of the optical image pickup means. Therefore, it is practically difficult to make the eye positions of the right and left image pickup systems generally coincident. In view of this, in the embodiments of this invention, a plurality of optical image pickup means are set such that each entrance pupil is present at the position nearer to an object than the lens nearest to the object among lenses of the optical image pickup means. It is therefore possible to readily dispose the plurality of optical image pickup means such that the cross points between the entrance pupils and optical axes become generally coincident.

As described above, the problem of parallax can be solved by making generally coincident the centers of entrance pupils, i.e., the cross points between entrance pupils and optical axes. Recently, a zoom lens capable of changing its focal length is generally used with an optical image pickup system such as video cameras. As the focal length of the zoom lens is changed, the position of the entrance pupil changes. It is therefore difficult to make generally coincident the cross points of entrance pupils and optical axes of zoom lenses used with a compound eye image pickup apparatus. In the embodiments of the invention, the focal length is limited in a predetermined range when a plurality of optical image pickup means are set at the first position. It is therefore possible to provide a compound eye image pickup apparatus even with zoom lenses.

Figure 18:
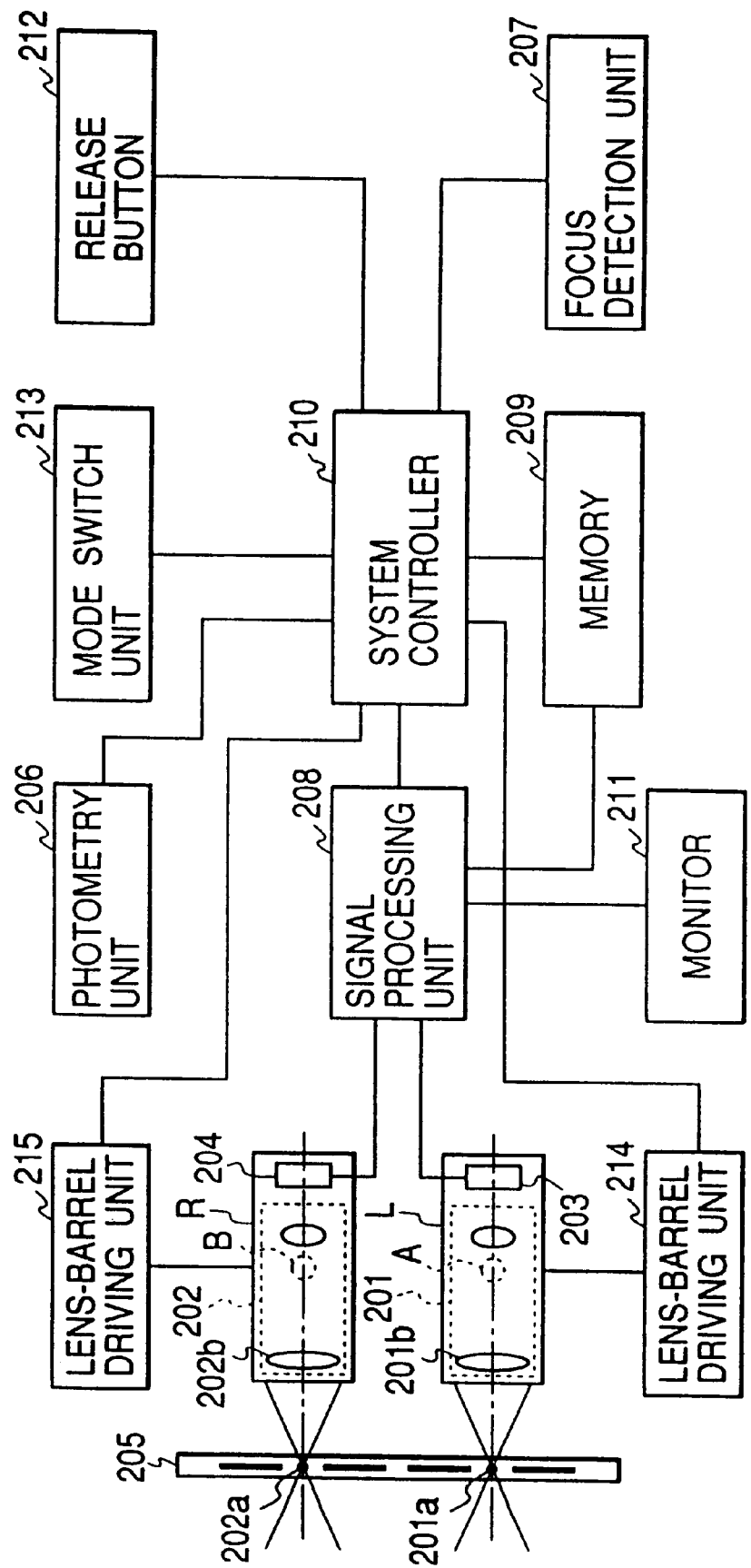
FIG. 18 is a block diagram showing the structure of a compound eye image pickup apparatus according to a sixth embodiment of the present invention.

FIG. 18 is a block diagram showing the structure of a compound eye camera according to the sixth embodiment of the invention. In FIG. 18, reference numerals 201 and 202 represent an optical image pickup system, and reference numerals 201*a* and 202*a* represent entrance pupils which indicate the positions of cross points between the entrance pupils and optical axes of the optical image pickup systems 201 and 202. As shown, the entrance pupils 201*a* and 202*a* are at the positions nearer to the object than lenses 201*b* and 202*b* of the optical image pickup systems 201 and 202 which are nearest to the object among lenses of the systems 201 and 202. In the state shown in FIG. 18, the optical axes of the optical image pickup systems 201 and 202 are generally parallel and the entrance pupils 201*a* and 202*a* are spaced apart by a predetermined distance. There is some parallax in the images taken in this state. Therefore, if an image of an object taken with the optical image pickup system 201 is reproduced to be visible only by the left eye of a viewer and that taken with the optical image pickup system 202 is reproduced to be visible only by the right eye, a stereoscopic image can be reproduced. Reference numerals 203 and 204 represent image pickup elements for converting optical images focussed by the optical image pickup systems 201 and 202 into electrical image signals.

Figure 19:
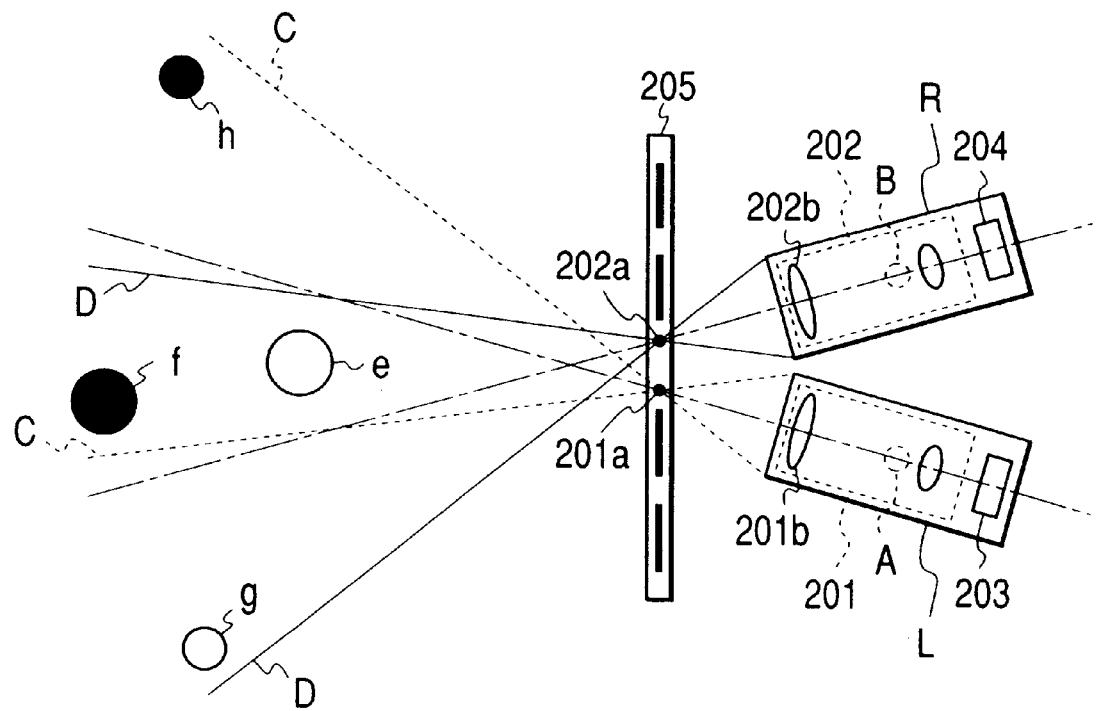
FIG. 19 is a schematic diagram showing images of objects taken with optical image pickup systems and an image after synthesizing.

Reference character L represents an optical image pickup system constituted of the optical image pickup system 201 and an image pickup element 203, whereas reference character R represents an optical image pickup system constituted of the optical image pickup system 202 and an image pickup element 204. The optical image pickup systems L and R are housed in lens barrels and supported by the compound eye camera body to be rotatable about shafts A and B. Barrel drive units 214 and 215 can move the optical image pickup systems L and R from the state where the optical axes of the systems are generally parallel as shown in FIG. 18 to the state where the entrance pupils 201$a$ and 202$a$ are generally coincident as shown in FIG. 19. In FIG. 19, reference characters C and D represent image pickup ranges of the optical image pickup systems L and R, respectively. Reference characters e, f, g and h represent a spherical object.

There is no parallax between the images taken with the optical image pickup systems L and R as opposed to the case described earlier. In this case, the images of the objects e, f, g and h taken with the optical image pickup systems L and R become as shown in FIGS. 2A and 2B. As seen from FIGS. 2A and 2B, the areas taken in duplicate with the optical image pickup systems L and R have the same objects. It is therefore easy to form a panoramic image by synthesizing the two images with the overlapped areas shown in FIGS. 2A and 2B being superposed one upon the other.

Figure 20A:
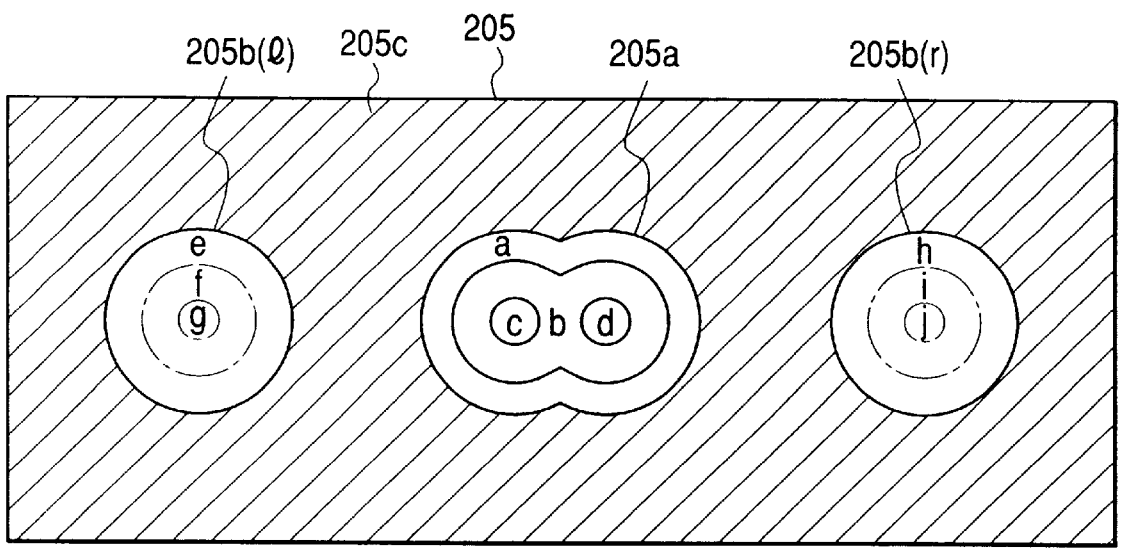
FIGS. 20A and 20B are schematic diagrams showing stops as viewed along the optical axes.
Figure 20B:
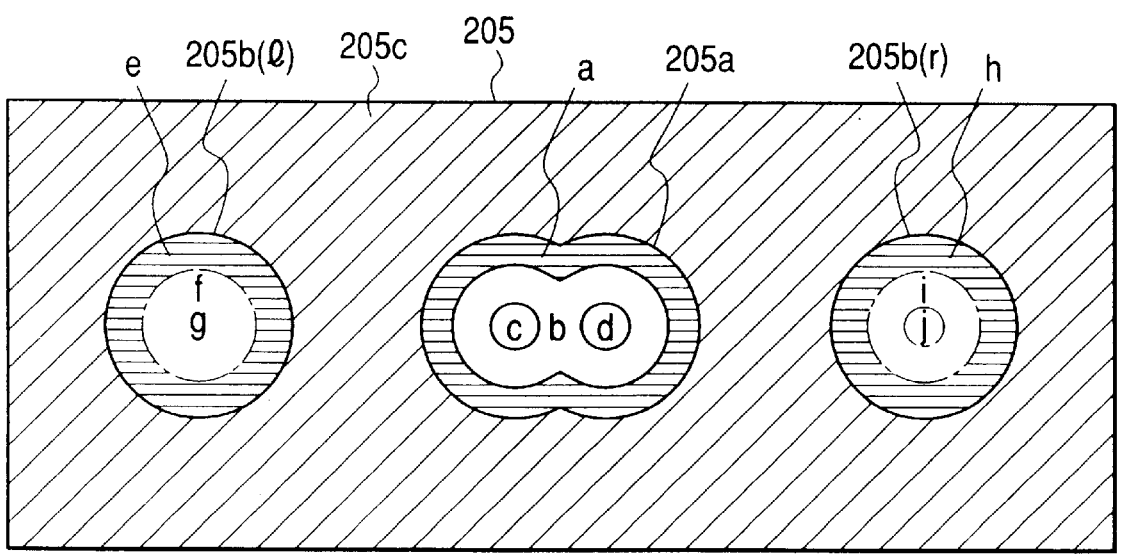

Reverting back to FIG. 18, reference numeral 205 represents a stop unit for controlling the amount of light incident upon the optical image pickup systems L and R. FIGS. 20A and 20B show the stop unit 205 as viewed from the side of the optical image pickup system L and R. FIG. 20A shows an opened stop. In FIGS. 20A and 20B, reference numeral 205 represents a common stop which is shared by both the optical image pickup systems L and R when the optical image pickup systems L and R take the state shown in FIG. 19. Reference numerals 205$b$(L) and 205$b$(R) represent an independent stop which is used independently by the optical image pickup systems L and R when the systems take the state shown in FIG. 18. An opening of each stop is made of liquid crystal which transmits or intercepts light in accordance with electrical conduction therethrough. This opening is divided into concentric regions a to j. Reference numeral 205$c$ represents a light shielding region which completely intercepts light. By controlling the concentric regions a, e and h not to transmit light, the state shown in FIG. 20B is established so that the light amount of each stop can be controlled. In this embodiment, since it is difficult to make the optical axes of the optical image pickup systems L and R intersect at the common stop 205$a$, concentric openings are formed around the optical axes as shown in FIGS. 20A and 20B.

Reverting back to FIG. 18, reference numeral 206 represents a photometry unit for measuring the brightness of an object. Reference numeral 207 represents a focus detection unit for detecting an in-focus state of the optical image pickup systems L and R. Reference numeral 208 represents a signal processing unit for synthesizing two sets of image data obtained by the image pickup elements 203 and 204 and converting the synthesized image data into a predetermined image signal. Reference numeral 209 represents a memory for storing image data supplied from the signal processing unit 208 or other data. Reference numeral 210 represents a system controller for controlling the entirety of the compound eye camera. Reference numeral 211 represents a monitor for displaying image signals obtained by the signal processing unit 208. Reference numeral 212 represents a release button which generates a release signal upon actuation thereof. Reference numeral 213 represents a mode switch unit for switching between a panoramic photographing mode for forming a panoramic image and a stereoscopic photographing mode for forming a stereoscopic image.

Figure 21:
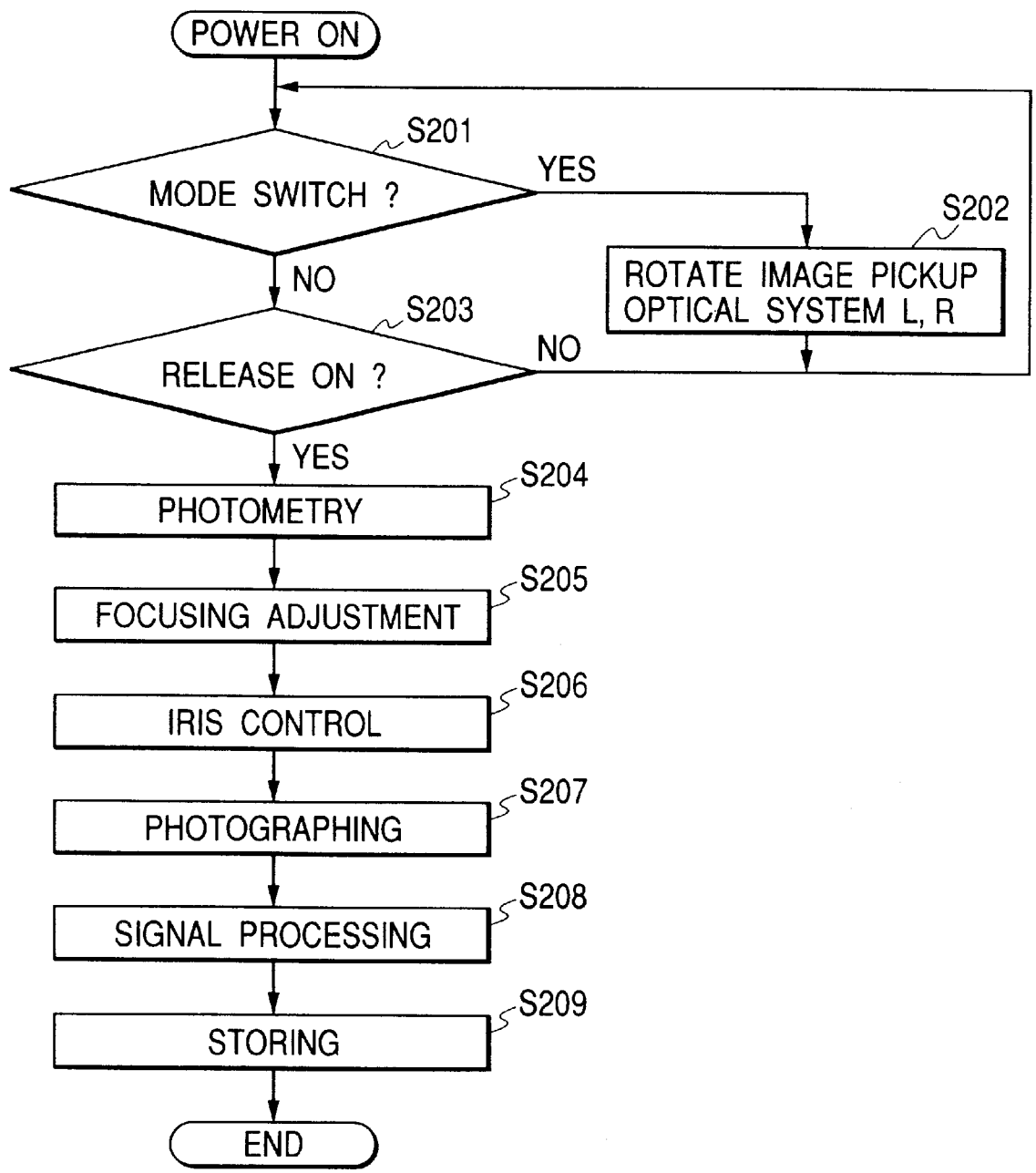
FIG. 21 is a flow chart illustrating the operation of the compound eye apparatus of the sixth embodiment.

Next, the operation of the compound eye camera will be described. FIG. 21 is a flow chart illustrating the operation of the compound eye camera shown in FIG. 18. The operations are assumed to be controlled by the system controller 210, unless otherwise specifically described. Referring to FIGS. 18 and 21, when a power switch (not shown) of the compound eye camera is turned on, the state of the photographing mode switch unit 213 is detected (Step S201). If the photographing mode switch unit 213 was operated to select the panoramic photographing mode, the optical image pickup systems L and R are set to have the state shown in FIG. 19, whereas if the stereoscopic photographing mode is selected, the optical image pickup systems L and R are set to have the state shown in FIG. 18, to thereby switch between the stereoscopic and panoramic photographing modes (Step S202). Next, as the release button 212 is activated and a release signal is generated (Step S203), the brightness of an object is measured with the photometry unit 2066 and in accordance with this photometric value, a stop value and a shutter speed are determined (Step S204).

Next, the focus detection unit 207 adjusts the optical image pickup systems L and R to focus the object (Step S205). Next, in accordance with the stop value determined at Step S204, the common stop 205$a$ is controlled if the optical image pickup systems L and R take the state shown in FIG. 19, i.e., the panoramic photographing mode, whereas if the optical image pickup systems L and R take the state shown in FIG. 18, i.e., the stereoscopic photographing mode, the independent stops 205$b$(L) and 205$b$(R) are controlled (Step S206). At the shutter speed determined at Step S204, the image pickup elements 203 and 204 are exposed (Step S207). Signals obtained by the image pickup elements 203 and 204 are processed by the signal processing unit 208 in accordance with each photographing mode (Step S208). The signal processing unit 208 performs trapezium distortion correction in the panoramic photographing mode, prior to synthesizing two image signals obtained by the optical image pickup systems L and R into one continuous image signal.

Figure 22:
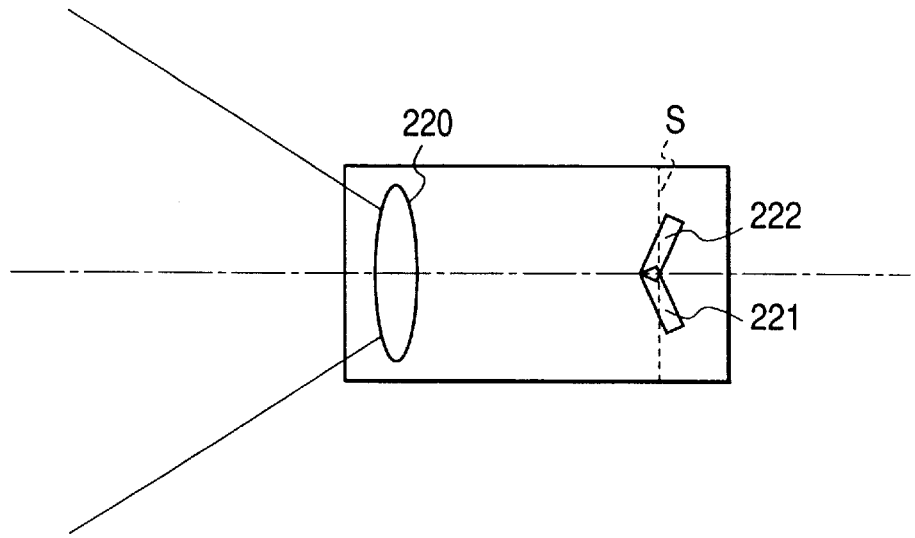
FIG. 22 is a schematic diagram illustrating the principle of trapezium distortion.

The trapezium distortion will be described. FIG. 22 shows an optical image pickup system having the image pickup range equivalent to the optical image pickup systems L and R shown in FIG. 19. Reference numeral 220 represents a taking lens, and reference numerals 221 and 222 represent an image pickup element. As seen from FIG. 22, the image pickup elements 221 and 222 are slanted relative to the optical axis of the taking lens 220 having an angle of view of the image pickup range equivalent to the optical image pickup systems L and R shown in FIG. 19, in correspondence with a cross angle between the optical axes of the optical image pickup systems L and R. The reason for this is as follows. If the optical image pickup systems L and R take the state shown in FIG. 19, the optical axes of the optical image pickup systems L and R cross at a predetermined angle, and these systems are slanted relative to the center object. Therefore, an image focussed with the taking lens 220 does not coincide with an image focussed on one plane indicated by a broken line S, but becomes a distorted image. This distortion is the trapezium distortion. In this embodiment, this trapezium distortion is corrected so that an image taken with the optical image pickup systems L and R becomes equivalent to an image focussed on one plane by the taking lens 220 having the same image pickup range as the optical image pickup systems L and R.

Reverting back to FIG. 21, the signal processing unit 208 extracts corresponding points of two overlapped image portions of two image signals with corrected trapezium distortions, and obtains an overlap amount of the two image signals in accordance with the corresponding points, to thereby form an elongate image such as shown in FIG. 2C. In the stereoscopic photographing mode, the signal processing unit 208 adds photographing information, such as an identification signal representing a pair of image signals and a photographing condition signal, to the two image signals. The image signal processed by the signal processing unit 208 in the above manner is stored in the memory 209 (Step S209).

The above operations complete a single photographing sequence. The image signal stored in the memory 209 can be reproduced on the monitor 211 by activating an unrepresented reproduction button to make the compound eye camera enable to reproduce. If a stereoscopic image is to be displayed on the monitor 211, the images taken with the optical image pickup systems L and R are alternately displayed in time sequence. In this case, the right eye of an image viewer is shielded while the left image is displayed, whereas the left eye is shielded while the right image is displayed. This is a so-called liquid crystal shutter glass for viewing a stereoscopic image. In the panoramic photographing mode, a more natural panoramic image can be formed because trapezium distortion was corrected by the signal processing unit 208.

In this embodiment, although liquid crystal is used as the stops for controlling the light amount of the optical image pickup systems L and R, the invention is not limited only to liquid crystal. For example, the opening amount may be controlled by using electrochromic material or by mechanically driving a plurality of stop vanes.

Figure 23:
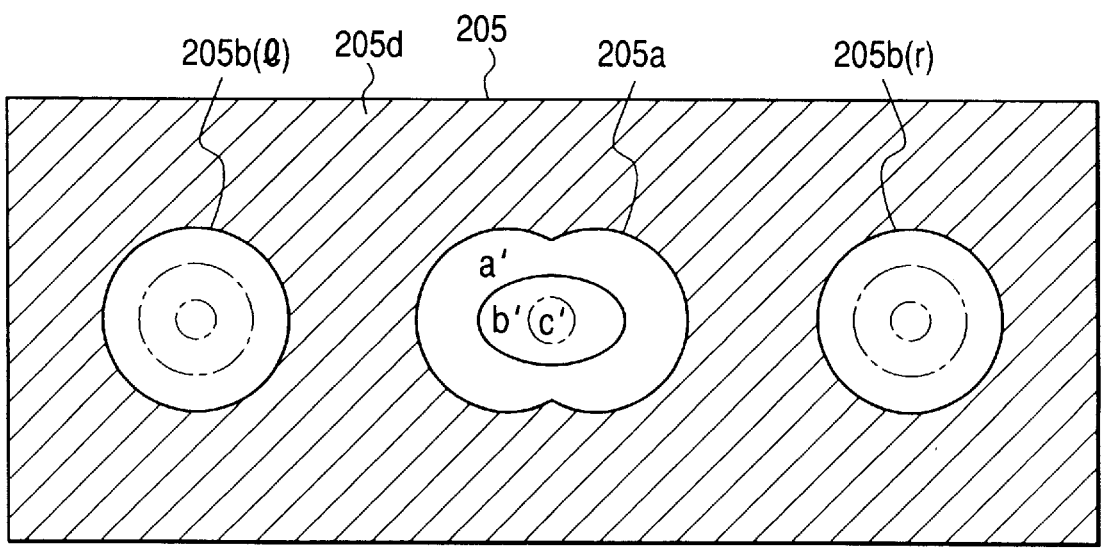
FIG. 23 is a schematic diagram showing stops according to a seventh embodiment of the invention.

As the seventh embodiment of this invention, the common stop 205a may be controlled to always have a single opening as shown in FIG. 23. As shown, the common stop 205a is divided into concentric stops a', b' and c' about the middle point between the optical axes of the optical image pickup systems L and R. In this case, the more the stop is made narrow, the shorter the distance between centers of the entrance pupils of the optical image pickup systems L and R becomes. It is therefore possible to provide a compound eye camera with more scarce parallax.

Figure 24A:
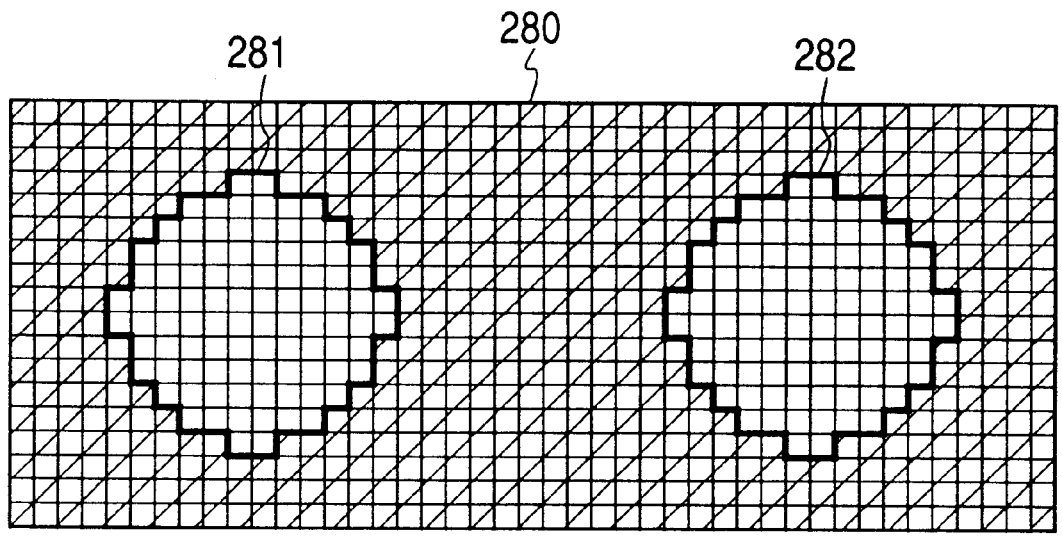
FIGS. 24A and 24B are schematic diagrams showing stops according to an eighth embodiment of the invention.
Figure 24B:
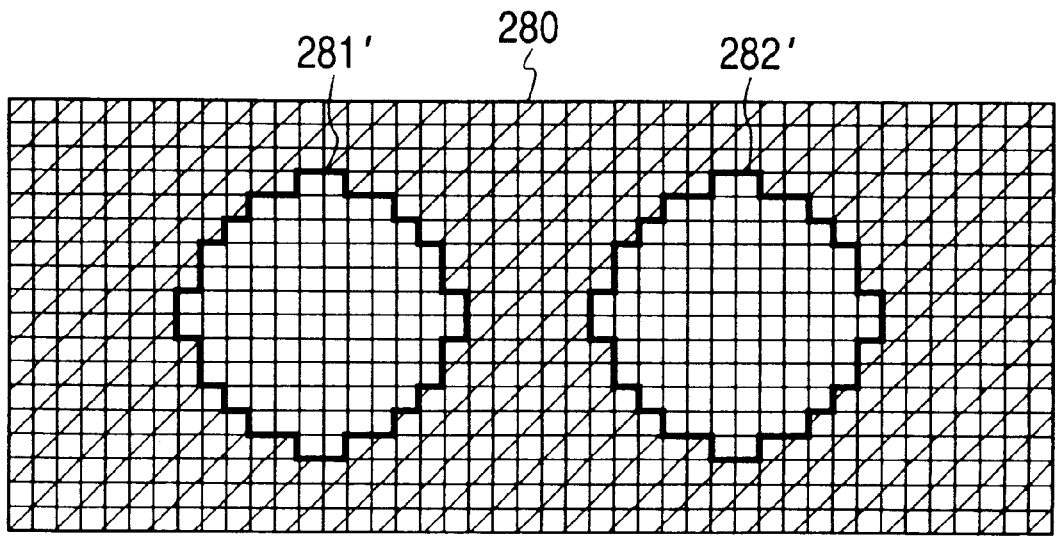

As the eighth embodiment of the invention, the stops 205 may be formed as shown in FIGS. 24A and 24B. In FIG. 24A, reference numeral 280 represents a liquid crystal. Light can be controlled to be transmitted or intercepted at each small square shown in FIGS. 24A and 24B. Regions 281 and 282 can transmit light and form stop opening regions. In this embodiment, the stops are formed in the above manner. By setting each small square to the light transmission state or interception state, it is possible to change the positions of the stop opening regions 281 and 282, for example, from the positions shown in FIG. 24A to the positions 281' and 282' shown in FIG. 24B. Therefore, by changing the positions of the stop opening regions in accordance with the rotation of the optical image pickup systems L and R, it is possible to take the image of an object at any rotary position in a predetermined range of the optical image pickup systems L and R, in addition to the positions shown in FIGS. 18 and 19.

Figure 25A:
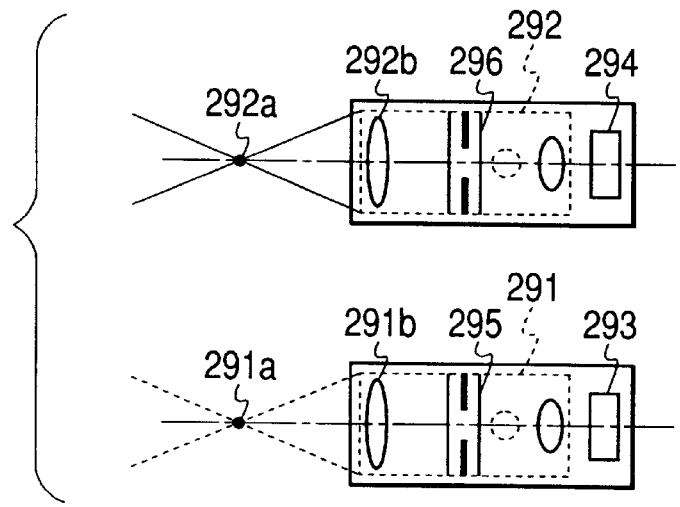
FIGS. 25A and 25B are schematic diagrams showing the structures of an image pickup system according to a ninth embodiment of the invention.
Figure 25B:
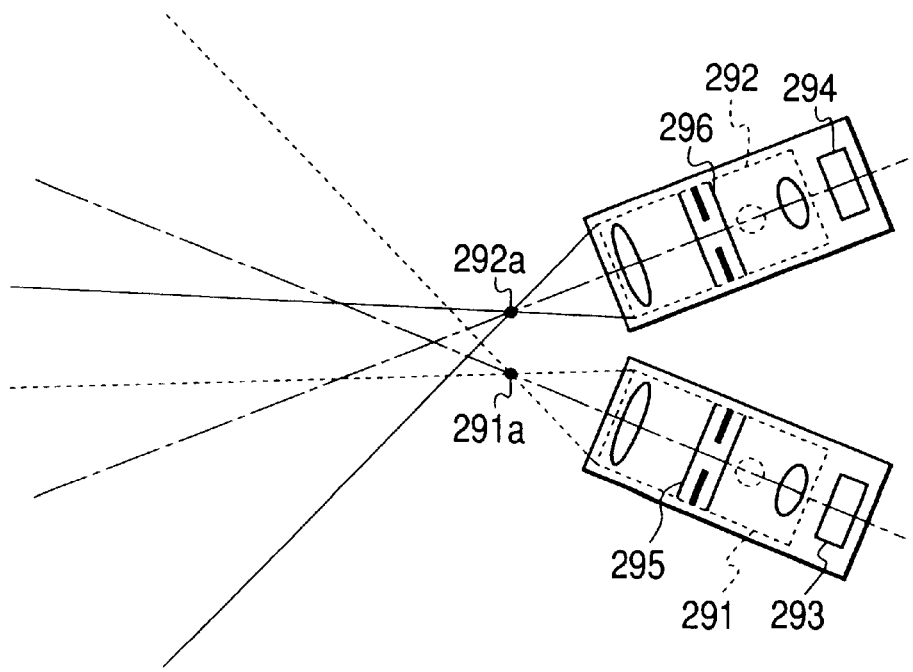

In the optical image pickup systems L and R of the sixth embodiment, the positions of the entrance pupils 201a and 202a and the stop 205 are coincident. Other optical image pickup systems such as shown in FIGS. 25A and 25B may be used, which are realized as the ninth embodiment of the invention. In FIG. 25A, reference numerals 291 and 292 represent an optical image pickup system, and reference numerals 291a and 292a represent entrance pupils of the optical image pickup systems 291 and 292 which indicate the positions of cross points between the entrance pupils and optical axes of the optical image pickup systems 291 and 292. As shown, the entrance pupils 201a and 202a are at the positions nearer to the object than lenses 291b and 292b of the optical image pickup systems 291 and 292 which are nearest to the object among lenses of the systems 291 and 292. Reference numerals 293 and 294 represent image pickup elements for converting optical images focussed by the optical image pickup systems 291 and 292 into electrical image signals. Reference numerals 295 and 296 represent stops of the optical image pickup systems 291 and 292. As shown, the stops 295 and 296 are at the positions nearer to the side of the focussing planes of the image pickup elements than lenses 291b and 292b of the optical image pickup systems 291 and 292 which are nearest to the object among lenses of the systems 291 and 292. In this embodiment, therefore, the stops 295 and 296 for controlling the amount of light incident upon the optical image pickup systems 291 and 292 are not at the positions nearer to the object than the positions of the entrance pupils 291a and 292a, i.e., than the positions of the lenses 291b and 292b which are nearest to the object among lenses of systems 291 and 292. It is therefore possible to reduce the size of the optical image pickup systems 291 and 292.

Figure 26:
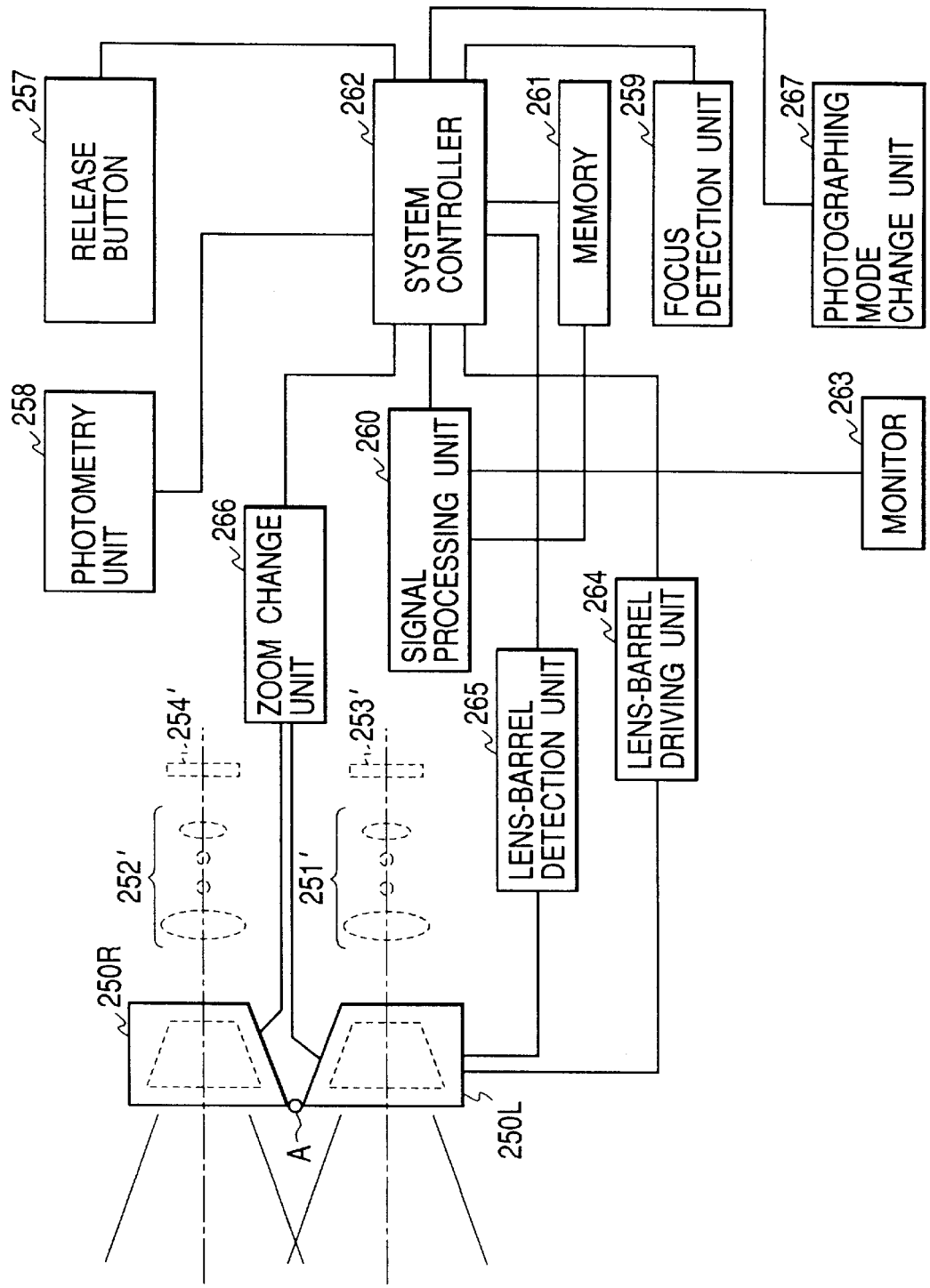
FIG. 26 is a block diagram showing a compound eye image pickup apparatus according to a tenth embodiment of the invention.
Figure 27:
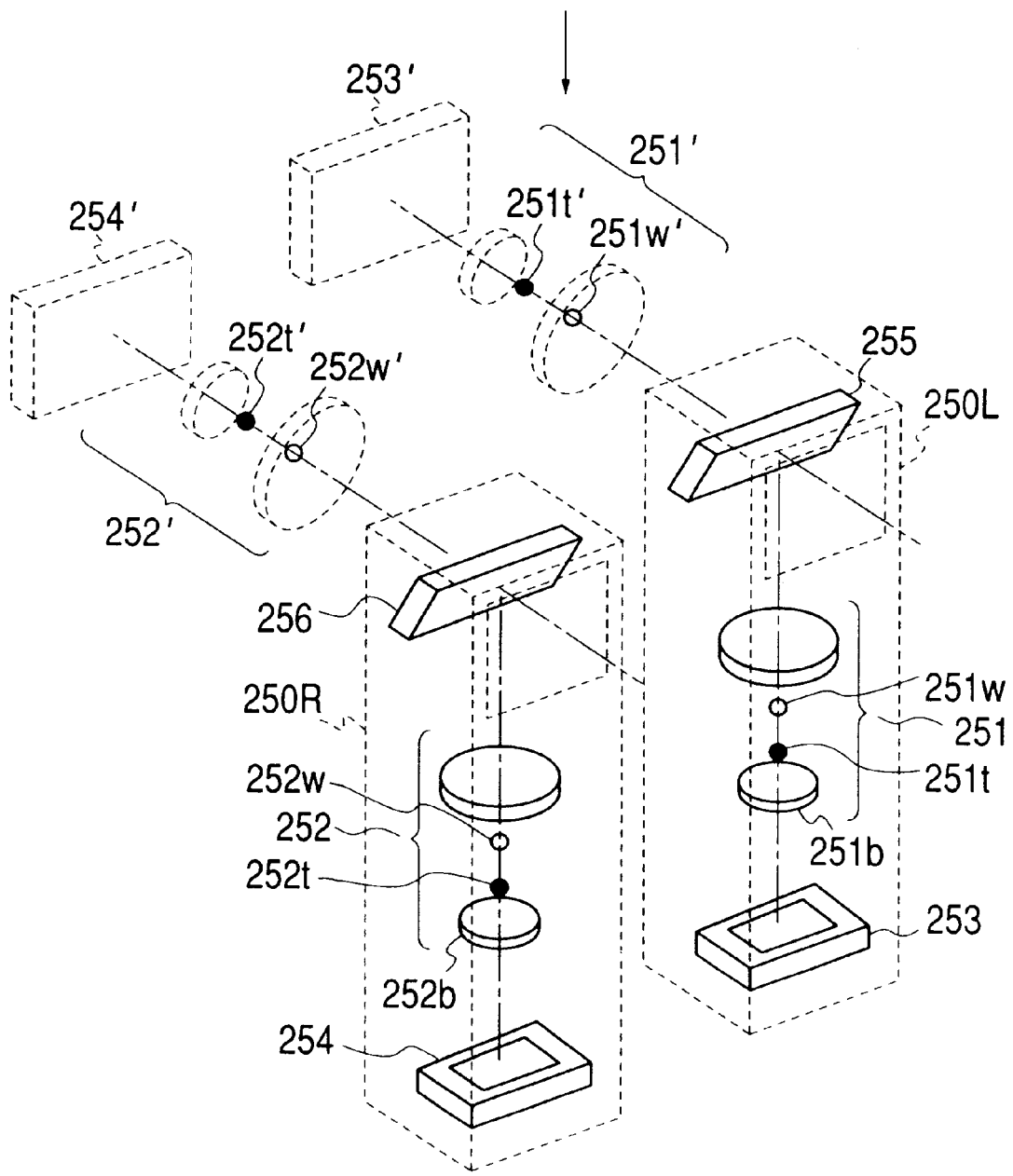
FIG. 27 is a perspective view showing the internal structure of lens barrels L and R.

FIG. 26 is a block diagram showing the structure of a compound eye camera according to the tenth embodiment of the invention. In FIG. 26, reference numerals 250L and 250R represent a lens barrel which holds an optical image pickup system capable of changing a focal length to be described later, an image pickup element and the like, the lens barrel being fixed to a compound eye camera body to be rotatable about the shaft A. FIG. 27 shows the internal structures of the lens barrels 250L and 250R. Reference numerals 251 and 252 represent the optical image pickup systems capable of changing a focal length. Reference numerals 251w and 252w indicate the positions of cross points between entrance pupils and optical axes of the optical image pickup systems 251 and 252 at the shortest focal length. Reference numerals 251t and 252t indicate the positions of cross points between entrance pupils and optical axes of the optical image pickup systems 251 and 252 at the longest focal length. Reference numerals 251b and 252b represent variable magnification lenses for changing a focal length by moving along the optical axes of the optical image pickup systems 251 and 252. Reference numerals 253 and 254 represent the image pickup elements for converting optical images focussed by the optical image pickup systems 251 and 252 into electrical image signals. Reference numerals 255 and 256 represent reflection mirrors disposed in front of the optical image pickup systems 251 and 252 for introducing object light fluxes to the optical image pickup systems 251 and 252.

Reference numerals 251', 252', 253' and 254' indicate the imaginary images of the optical image pickup systems 251 and 252 and image pickup elements 253 and 254 formed by the reflection mirrors 255 and 256. Reference numerals 251w', 252w', 251t' and 252t' indicate the imaginary images 251w, 252w, 251t and 252t of the positions of cross points between entrance pupils and optical axes of the optical image pickup systems 251 and 252 formed by the reflection mirrors 255 and 256. Therefore, the equivalent state of the optical image pickup systems 251 and 252 is ensured even if they are positioned at the imaginary image positions 251' and 252' obtained by the reflection mirrors 255 and 256. Namely, in the state of the lens barrels 250L and 250R shown in FIGS. 26 and 27, the optical axes of the optical image pickup systems 250L and 250R are spaced by a predetermined distance and are parallel.

Reverting back to FIG. 26, reference numeral 257 represents a release button which generates a release signal upon activation thereof. Reference numeral 258 represents a photometry unit for measuring the brightness of an object. Reference numeral 259 represents a focus detection unit for detecting an in-focus state of the optical image pickup systems 251 and 252. Reference numeral 260 represents a signal processing unit for synthesizing two sets of image data obtained by the image pickup elements 253 and 254 and converting the synthesized image data into a predetermined image signal. Reference numeral 260 represents a memory for storing image data supplied from the signal processing unit 260 or other data. Reference numeral 262 represents a system controller for controlling the entirety of the compound eye camera. Reference numeral 263 represents a monitor for displaying image signals obtained by the signal processing unit 260. Reference numeral 264 represents a lens barrel driving unit for rotating the lens barrels 250L and 250R about the shaft A. By operating this lens barrel driving unit 264, the lens barrels 250L and 250R can be changed from the state shown in FIG. 26 to the state shown in FIG. 28, or vice versa. Reference numeral 265 represents a lens barrel detection unit for detecting whether the lens barrels 250L and 250R take the state shown in FIG. 26 or 28. Reference numeral 266 represents a zoom change unit capable of moving the variable magnification lenses 251b and 252b upon activation thereof. Reference numeral 267 represents a photographing mode change unit.

Figure 28:
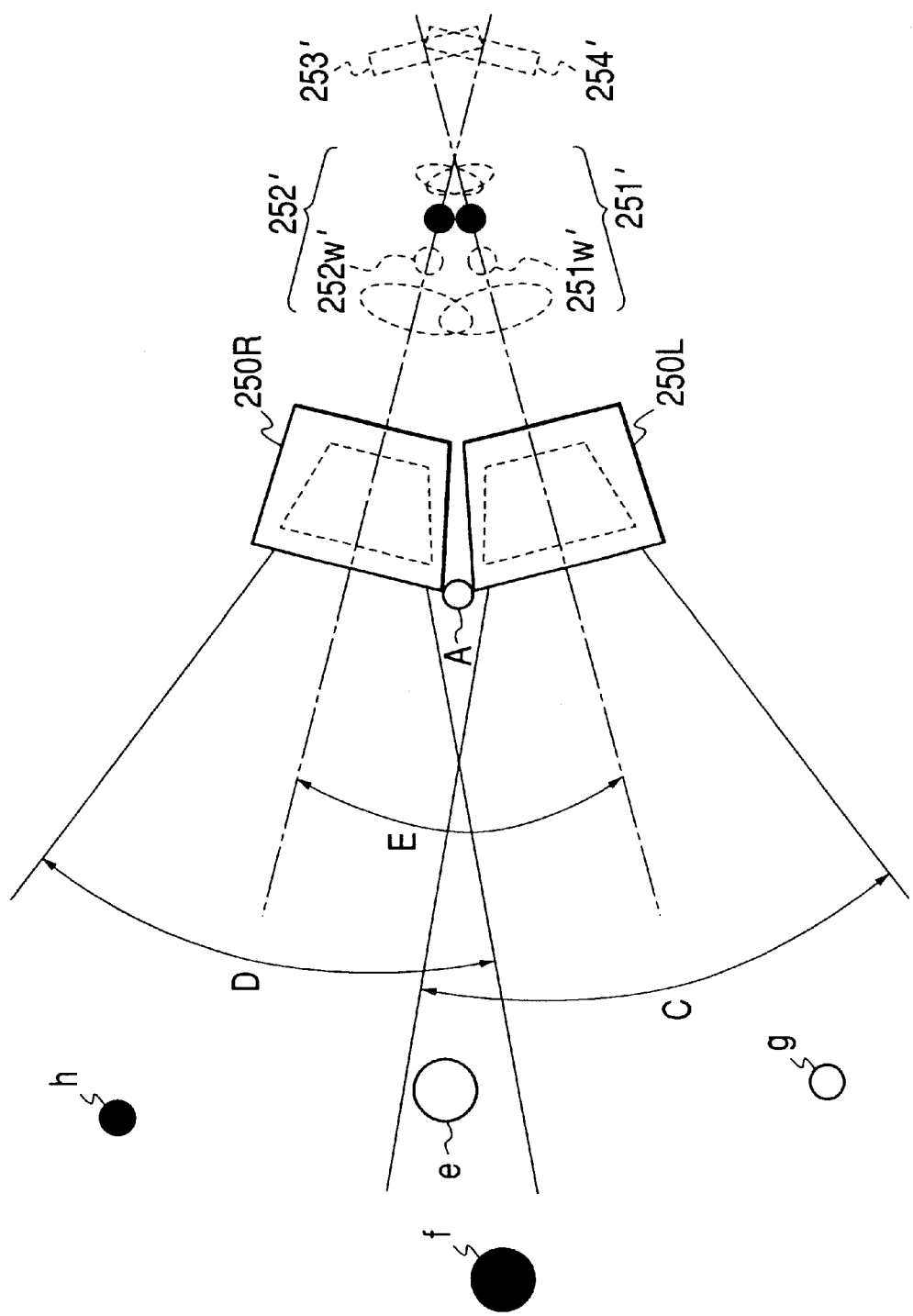
FIG. 28 is a schematic diagram illustrating the state of the lens barrels during panoramic photographing.
Figure 29B:
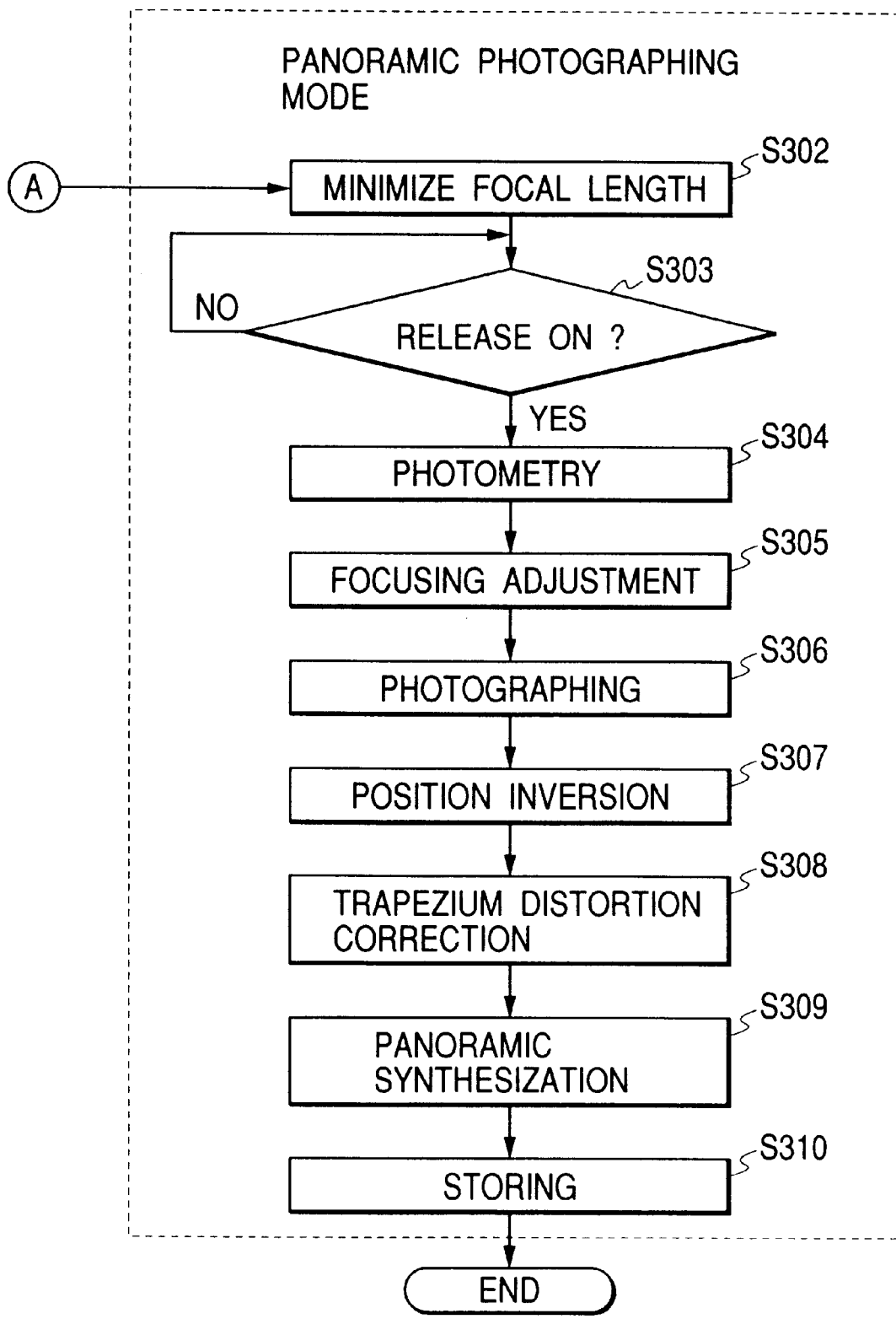
FIG. 29 comprised of FIGS. 29A and 29B, is a flow chart illustrating an operation of a compound eye image pickup apparatus according to a tenth embodiment of the invention.

Next, the operation of the compound eye camera will be described. FIGS. 29A and 29B are flow charts illustrating the operation of the compound eye camera shown in FIG. 26. The operations are assumed to be controlled by the system controller 262, unless otherwise specifically described. Referring to FIGS. 26, 29A and 29B, when a power switch (not shown) of the compound eye camera is turned on, the lens barrel detection unit 265 checks whether the lens barrels 250L and 250R takes the state shown in FIGS. 26 or 28. If they take the state shown in FIG. 26, the operation enters the stereoscopic photographing mode, whereas if they take the state shown in FIG. 28, it enters the panoramic photographing mode (Step S301).

The operation of the panoramic photographing mode will be described first. In the panoramic photographing mode, the focal lengths of the optical image pickup systems 251 and 252 are set shortest (Step S302). FIG. 28 shows the state of the lens barrels 250L and 250R in this case. In FIG. 28, reference characters C and D indicate the angles of views of the optical image pickup systems 251 and 252. Reference characters e, f, g and h represent a spherical object. In the state shown in FIG. 28, the equivalent state of the optical image pickup systems 251 and 252 is ensured even if they are positioned at the imaginary image positions 251' and 252' obtained by the reflection mirrors 255 and 256. Therefore, the cross points 251w and 252w between the entrance pupils or eye points and optical axes of the optical image pickup systems 251 and 252 are equivalently at the positions 251w' and 252w'. The eye positions of the optical image pickup systems 251 and 252 are very near to each other.

Reverting back to FIGS. 29A and 29B, as the release button 257 is activated and a release signal is generated (Step S303), the brightness of an object is measured with the photometry unit 256 and in accordance with this photometric value, a stop value and a shutter speed are determined (Step S304). Next, the focus detection unit 259 detects the focus state of the optical image pickup systems 251 and 252 relative to the object, and if it is out of focus, unrepresented focus adjusting lenses are driven to adjust the focus of the object (Step S305). Next, in accordance with the stop value and shutter speed determined at Step S304, the image pickup elements 253 and 254 are exposed (Step S306). The signal processing unit 260 inverts right and left signals obtained by the image pickup elements 253 and 254 and then corrects the imaginary images of the reflection mirrors 255 and 256 (Step S307). Next, the signal processing unit 260 corrects the trapezium distortion of the inverted right and left image signals (Step S308).

Figure 30:
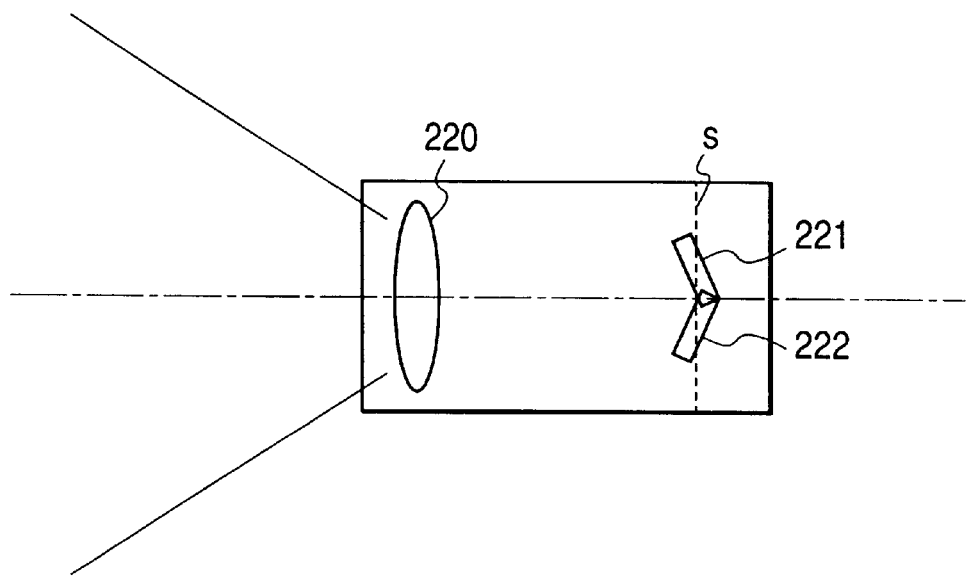
FIG. 30 is a schematic diagram illustrating the principle of trapezium distortion.

The trapezium distortion will be described. FIG. 30 shows an optical image pickup system having the image pickup range equivalent to the optical image pickup systems 250L and 250R shown in FIG. 26. Reference numeral 220 represents a taking lens, and reference numerals 221 and 222 represent an image pickup element. As seen from FIG. 30, the image pickup elements 221 and 222 are slanted relative to the optical axis of the taking lens 220 having an angle of view of the image pickup range equivalent to the optical image pickup systems 250L and 250R shown in FIG. 26, in correspondence with a cross angle between the optical axes of the optical image pickup systems 250L and 250R. The reason for this is as follows. The optical axes of the optical image pickup systems 251 and 252 cross at a predetermined angle, and these systems are slanted relative to the center object. Therefore, an image focussed with the taking lens 220 does not coincide with an image focussed on one plane indicated by a broken line S, but becomes a distorted image. This distortion is the trapezium distortion. In this embodiment, this trapezium distortion is corrected so that an image taken with the optical image pickup systems 251 and 252 becomes equivalent to an image focussed on one plane by the taking lens 220 having the same image pickup range as the optical image pickup systems 251 and 252 shown in FIG. 30.

Figure 31A:
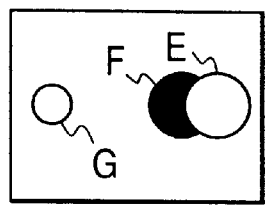
FIGS. 31A, 31B and 31C are schematic diagrams illustrating panorama synthesis.
Figure 31B:
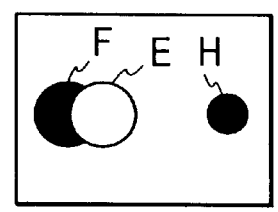
Figure 31C:
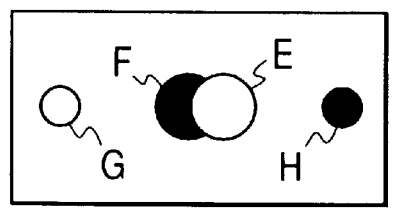

FIGS. 31A and 31B show images of objects E to H taken in the state shown in FIG. 28, the signal processing unit 260 inverting right and left image signals and then correcting the trapezium distortion of the image signals. As described previously, since the cross points or eye positions between the entrance pupils and optical axes of the optical image pickup systems 261 and 262 are generally coincident, the images shown in FIGS. 31A and 31B have scarce parallax. The signal processing unit 260 detects an overlap area of the image signals of the images shown in FIGS. 31A and 31B, deletes the overlap area from one of the image signals and adds the other signal to thereby form a single elongated image, i.e., panoramic image shown in FIG. 31C (Step S309).

Reverting back to FIGS. 29A and 29B, the panoramic image signal generated by the signal processing unit 260 is stored in the memory 261 (Step S310). The above operations complete a single sequence of the panoramic photographing mode. The image signal stored in the memory 261 can be reproduced on the monitor 263 by activating an unrepresented reproduction button to make the compound eye camera enable to reproduce. In this embodiment, in the panoramic photographing mode, the variable magnification lenses 251b and 252b are not moved even if the zoom change unit 266 is operated.

Next, the operation of the stereoscopic photographing mode will be described. If the lens barrels 250L and 250R take the state shown in FIG. 26 at Step S301, the operation enters the stereoscopic photographing mode. In this stereoscopic photographing mode, it is first checked (Step S321) whether the zoom change unit 266 is operated. If operated, the variable magnification lenses 251b and 252b are moved to change the focal lengths of the optical image pickup systems 251 and 252 (Step S329). Next, as the release button 257 is operated and a release signal is generated (Step S322), the photometry unit 258 measures the brightness of an object, and in accordance with this photometric value, a stop value and a shutter speed are determined (Step S323). Next, the focus detection unit 259 detects the focus state of the optical image pickup systems 251 and 252 relative to the object, and if it is out of focus, unrepresented focus adjusting lenses are driven to adjust the focus of the object (Step S324). Next, in accordance with the stop value and shutter speed determined at Step S323, the image pickup elements 253 and 254 are exposed (Step S325). The signal processing unit 260 inverts right and left signals obtained by the image pickup elements 253 and 254 and then corrects the imaginary images of the reflection mirrors 255 and 256 (Step S326), and thereafter adds photographing information, such as an identification signal representing a pair of image signals and a photographing condition signal, to the two image signals (Step S327). The image signal processed by the signal processing unit 260 in the above manner is stored in the memory 261 (Step S328). The above operations complete a single photographing mode.

In the stereoscopic photographing mode, the optical image pickup systems 251 and 252 take the state shown in FIG. 26, and a pair of image signals stored in the memory 261 has parallax. The image taken with the optical image pickup system 251, in this embodiment on the left side of the objects, is displayed so that only the left eye of a viewer can see it, whereas the image taken with the optical image pickup system 252, in this embodiment on the right side of the objects, is displayed so that only the right eye can see it. In this manner, a stereoscopic image can be reproduced. In this embodiment, the image signal stored in the memory 261 can be reproduced on the monitor 263 by activating an unrepresented reproduction button to make the compound eye camera enable to reproduce. If a stereoscopic image is to be displayed on the monitor 263, the images taken with the optical image pickup systems 251 and 252 are alternately displayed in time sequence. In this case, the right eye of an image viewer is shielded while the left image is displayed, whereas the left eye is shielded while the right image is displayed. This is a so-called liquid crystal shutter glass for viewing a stereoscopic image.

As above, according to this embodiment, a change in the photographing mode is detected from the positions of the lens barrels 250L and 250R. Accordingly, it is not necessary for a photographer to confirm the photographing mode each time the mode is changed, thereby making it easy to operate the apparatus.

In the above embodiment, the focal length during the panoramic photographing mode is fixed shortest. The invention is not limited to this fixation, but the focal length may be changed even during the panoramic photographing mode unless it hinders proper panoramic synthesis. In this case, the degree of freedom of the panoramic photographing can be increased.

In the above embodiment, although the overlap area of the optical image pickup systems is set during the panoramic photographing mode, this overlap area may not be set. In this case, the whole of both images taken with the optical image pickup systems is used for synthesizing a panoramic image.

Figure 32:
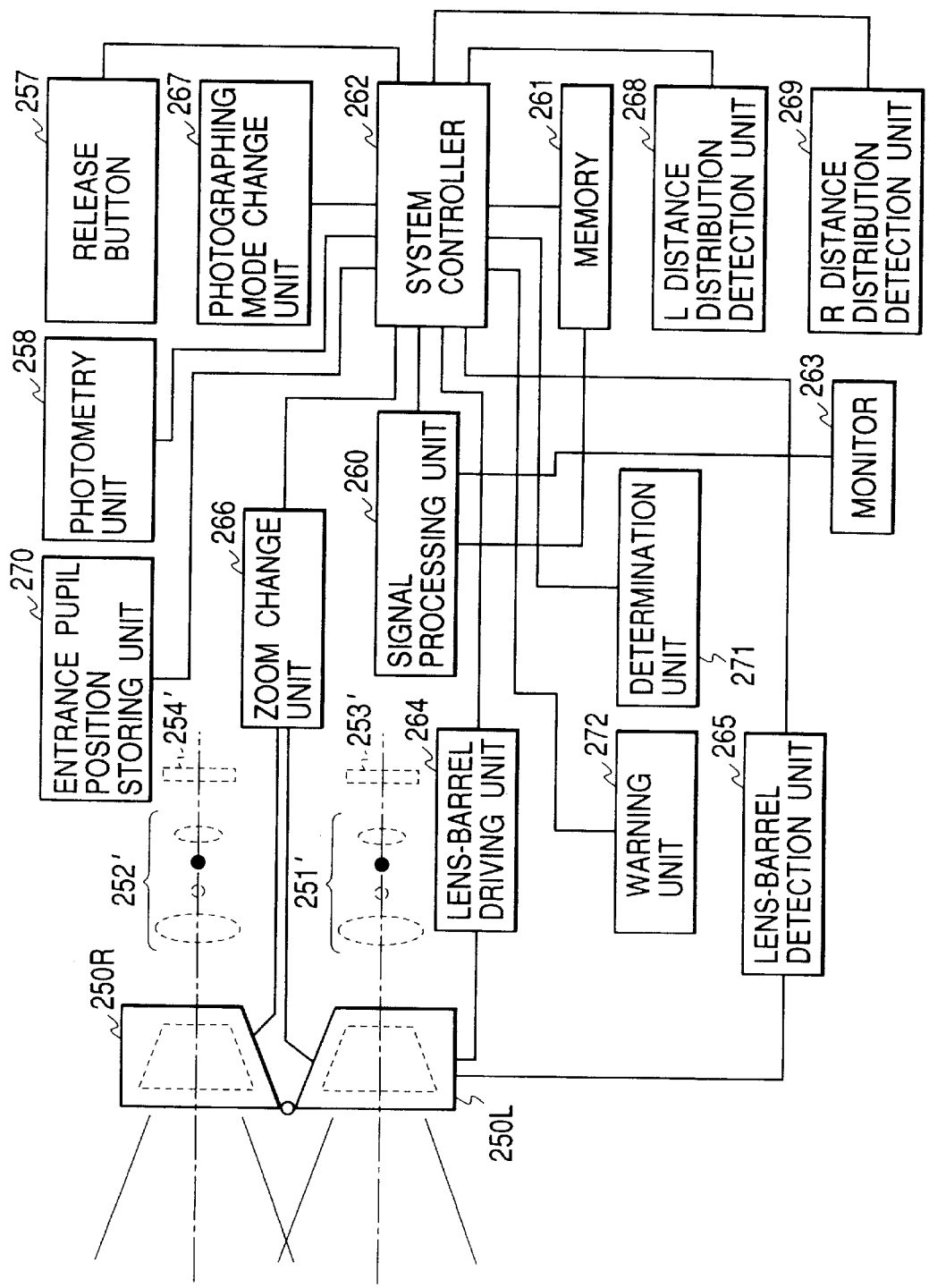
FIG. 32 is a block diagram showing a compound eye image pickup apparatus according to an eleventh embodiment of the invention.

FIG. 32 is a block diagram showing the structure of a compound eye camera according to the eleventh embodiment of the invention. Like elements to those shown in FIG. 26 are represented by the identical reference numerals and the duplicate description is omitted.

Referring to FIG. 32, lens barrels 250L and 250R have the same structure as the lens barrels 250L and 250R of the tenth embodiment shown in FIGS. 10A and 10B. The operation of the lens barrels 250L and 250R will be described with reference to FIG. 28 used for the tenth embodiment shown in FIGS. 10A and 10B. As different from the tenth embodiment, a lens barrel driving unit 264 of this embodiment can move and stop the lens barrels 250L and 250R to and at any position between the states shown in FIGS. 32 and 28.

Figure 33:
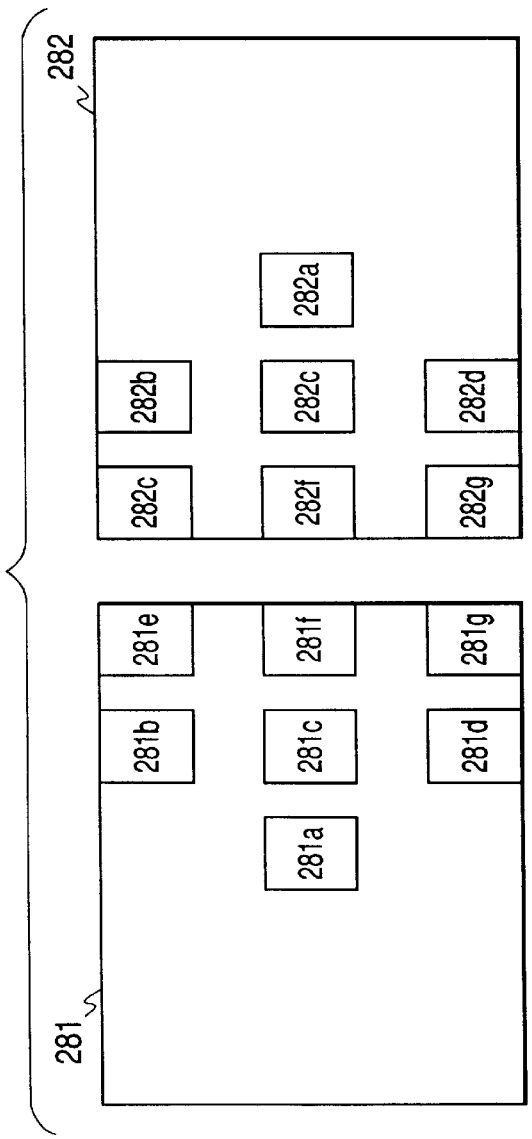
FIG. 33 shows a range finding area of the compound eye image pickup apparatus of the eleventh embodiment.

In FIG. 32, reference numerals 268 and 269 represent an L distance distribution detection unit and an R distance distribution detection unit for detecting an object distance in each photographing area of the optical image pickup systems 251 and 252. FIG. 33 is a schematic diagram showing range finding areas of the L and R distance distribution detection units 268 and 269. In FIG. 33, reference numeral 281 and 282 represent photographing areas of the optical image pickup systems 251 and 252. Reference numerals 281a to 281g represent range finding areas of the L distance distribution detection unit 268, and reference numerals 282a to 282g represent range finding areas of the R distance distribution detection unit 269. A photographer can select each range finding area to which a focus is adjusted, by using an unrepresented object selecting means.

Reverting back to FIG. 32, reference numeral 270 represents an entrance pupil position storing unit for storing the positions of cross points between entrance pupils and optical axes of the optical image pickup systems 251 and 252 at each focal point. Reference numeral 271 represents a determination unit for calculating a distance between the cross points between the entrance pupils and optical axes of the optical image pickup systems 251 and 252 in accordance with the focal lengths of the optical image pickup systems 251 and 252 and the rotary positions of the lens barrels 250L and 250R and the data stored in the entrance pupil position storing unit 270, and for comparing the calculated distance with an object distance distribution to be described later to thereby judge whether panoramic photographing can be performed properly or not. Reference numeral 272 represents a warning unit for notifying a user of a determination by the determination unit 271 if it determines that panoramic photographing cannot be performed properly.

Figure 34:
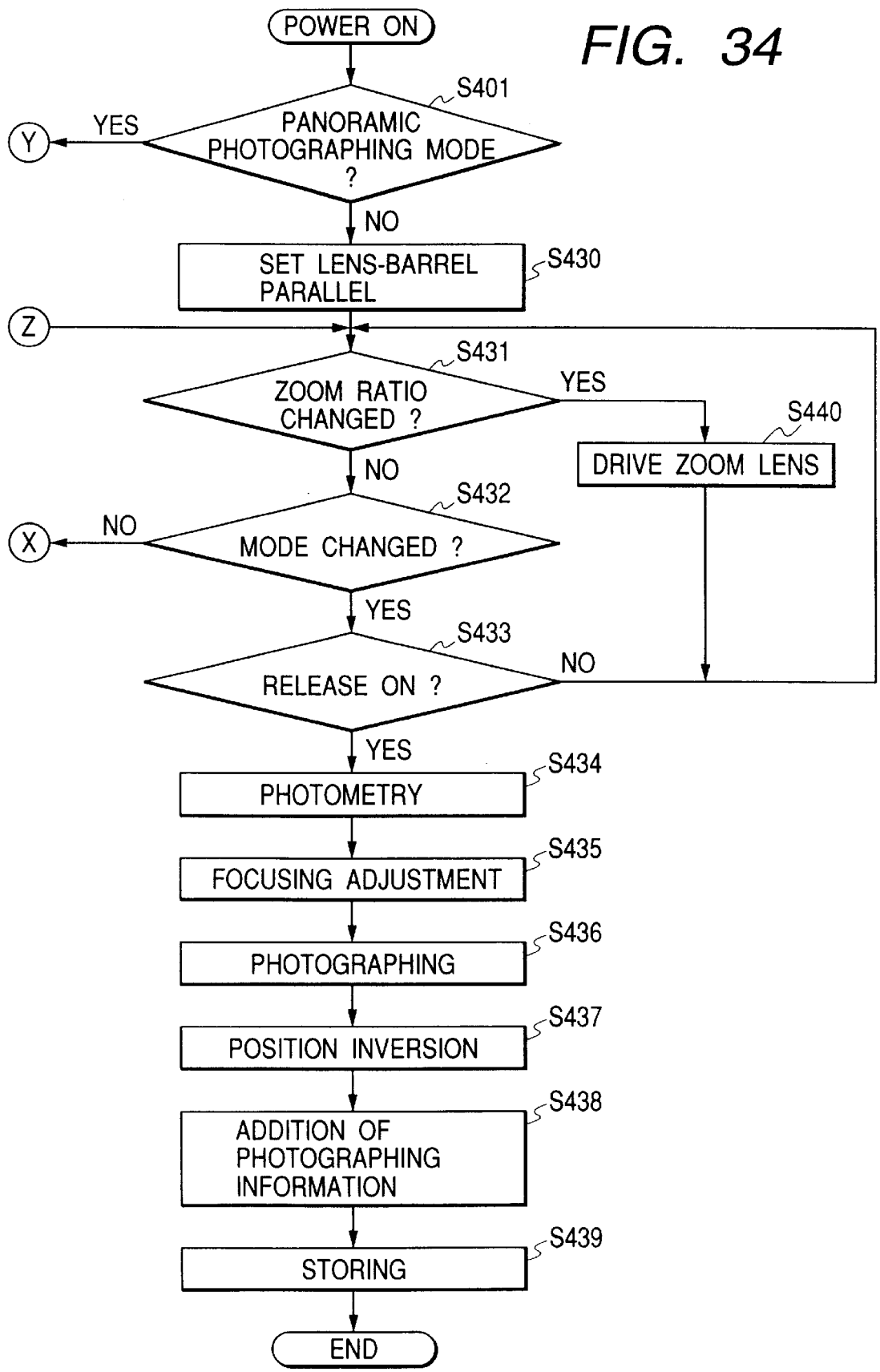
FIG. 34 is a flow chart illustrating an operation of the compound eye image pickup apparatus of the eleventh embodiment.
Figure 35:
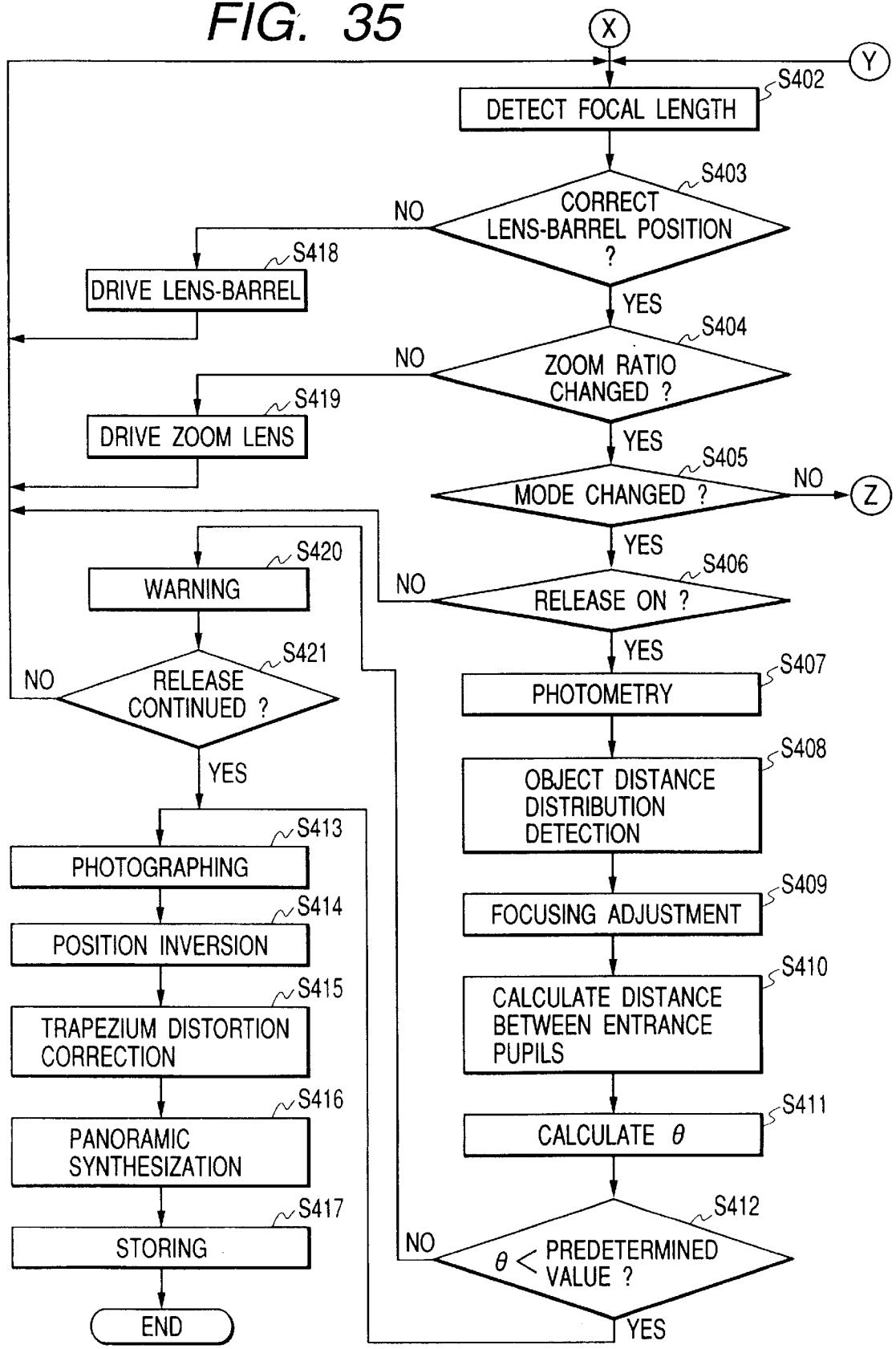
FIG. 35 is a flow chart illustrating an operation of the compound eye image pickup apparatus of the eleventh embodiment.

The operation of the compound camera will be described. FIGS. 34 and 35 are flow charts illustrating the operation of the compound camera shown in FIG. 32. The operations are assumed to be controlled by the system controller 262, unless otherwise specifically described. Referring to FIGS. 32, 34 and 35, when a power switch (not shown) of the compound eye camera is turned on, the photographing mode is detected (Step S401). First, the panoramic photographing mode will be described with reference to FIG. 35. In the panoramic photographing mode, the positions of the variable magnification lenses 251b and 252b are checked to obtain the focal lengths of the optical image pickup systems 251 and 252 and calculate the angles of the optical axes of the optical image pickup systems 251 and 252 (Step S402). Next, it is checked whether the positions of the lens barrels 250L and 250R correspond to the positions satisfying the calculated angles of the optical axes (Step S403). If the positions are different, the lens barrels 250L and 250R are driven by the lens barrel driving unit 264 to the positions corresponding to the calculated angles of the optical axes (Step S418).

FIG. 28 shows an example of the positions of the lens barrels 250L and 250R moved in the above manner. In this embodiment, the angle E between the optical axes of the optical image pickup systems 251 and 252 is set to a four fifth of the horizontal angle of view C, D of the optical image pickup systems 251 and 252 at each focal length. Namely, in the panoramic photographing mode, an overlap amount of the photographing area of the optical image pickup systems 251 and 252 is one fifth of the photographing area in the case of an object at an infinite distance.

A user can change the focal lengths of the optical image pickup systems 251 and 252 by operating the zoom change unit 266 (Step S404). When the zoom change unit 266 is operated, the zoom lenses 251a and 252b are driven correspondingly (Step S419) and thereafter the operation returns to Step S402. If the zoom change unit 66 is not operated at Step S404, the next Step is performed. At Step S405, the photographing mode change unit 267 is detected. When the photographing mode change unit 267 is operated, the photographing mode is changed at Step S431 shown in FIG. 34. If the photographing mode change unit 267 is not operated at Step S405, the next Step is performed. At Step S406, the release button 257 is detected. As the release button 257 is operated and a release signal is generated, the photometry unit 258 measures the brightness of an object, and in accordance with the photometric value, a stop value and a shutter speed are determined (Step S407). Next, the L and R distance distribution detection units 268 and 269 detect the object distance distributions in the photographing areas of the optical image pickup systems 251 and 252 (Step S408). In accordance with the range finding information obtained by the L and R distance distribution detection units 268 and 269, a focus of an object designated with the unrepresented object selecting means is adjusted (Step S409).

The determination unit 271 first calculates the distance between the cross points between the entrance pupils and optical axes of the optical image pickup systems 251 and 252, in accordance with the position information on the cross points between the entrance pupils and optical axes at the present focal length read from the entrance pupil position storing unit 270 and in accordance with the angles of the optical axes (Step S410). Then, the determination unit 271 performs the following calculations in accordance with the object distance distributions detected with the L and R distance distribution detection units 268 and 269 and the distance between the entrance pupils and optical axes of the optical image pickup systems 251 and 252.

Figure 36:
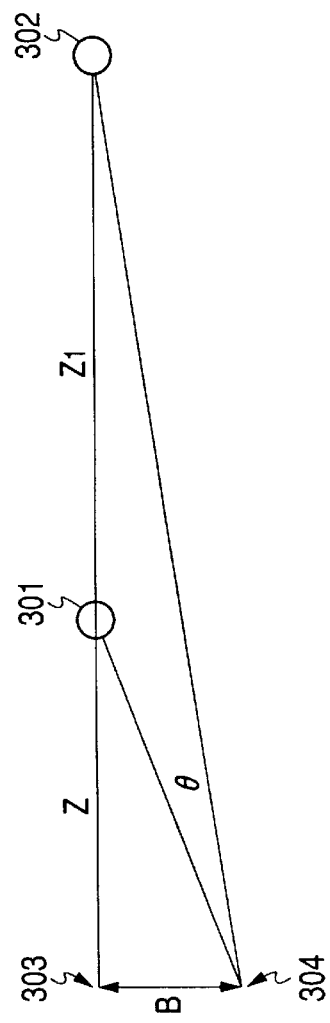
FIG. 36 is a diagram illustrating the relationship between an object distance distribution and a distance between cross points between entrance pupils and optical axes.

FIG. 36 shows the relationship between the object distance distributions and the distance between the cross points between the entrance pupils and optical axes of the optical image pickup systems 251 and 252. In FIG. 36, reference numeral 301 represents an object at the nearest position in the object distance distributions, and reference numeral 302 represents an object at the farthest position. Reference numerals 303 and 304 indicate the cross points or eye positions between the entrance pupils and optical axes of the optical image pickup systems 251 and 252. As seen from FIG. 36, the objects 301 and 302 on a straight line extending from the eye position 303 are viewed from the eye position 304 as spaced apart by an angle θ in the horizontal direction. This angle θ is given by the following equation (1):

$$\theta = \arctan(B/Z) - \arctan\{B/(Z+Z1)\} \quad (1)$$

where B is a distance between cross points between the entrance pupils and optical axes, Z is a distance to the object at the nearest position, and Z1 is a distance between the objects at the nearest and farthest positions.

The determination unit 271 calculates the angle θ (Step S411) and compares it with a predetermined value (Step S412). If the angle is smaller than the predetermined value, the next Step is performed, whereas if it is larger than the predetermined value it is judged that panoramic synthesis cannot be performed properly because of parallax and the warning unit 72 is activated (Step S419). In this embodiment, it is assumed that the predetermined value is an angle corresponding to one pixel. At Step S413, the image pickup elements 253 and 254 are exposed at the stop value and shutter speed determined at Step S409. Similar to the tenth embodiment, the signal processing unit 260 inverts (Step S414) the right and left image signals picked up with the image pickup elements 253 and 254, corrects (Step S415) trapezium distortion, and generates (Step S416) panoramic image signals. These image signals generated by the signal processing unit 260 are stored in the memory 263 (Step S417). The above operations complete a single photographing sequence. In this embodiment, it is assumed that even if warning is issued at Step S420, this warning can be neglected if the user continues to depress the release button 257 at Step S421. The panoramic photographing mode has been described above.

Next, the operation of the stereoscopic photographing mode will be described. If the photographing mode is set to the stereoscopic photographing mode at Step S401, the operation enters the stereoscopic photographing mode. In this stereoscopic photographing mode, the lens barrels 250L and 250R are changed to the positions shown in FIG. 32, i.e., the positions where the optical axes of the optical image pickup systems 251 and 252 become parallel (Step S430). Next, it is checked whether the zoom change unit 266 is operated (Step S431). If operated, the variable magnification lenses 251b and 252b are moved to change the focal lengths of the optical image pickup systems 251 and 252 (Step S440). If the zoom change unit 266 is not operated at Step S431, the next Step is performed. At Step S432, the photographing mode change unit 267 is detected, and if it is operated, Step S402 shown in FIG. 35 is performed to change the photographing mode.

If the photographing mode change unit 267 is not operated at Step S432, the next Step is performed. At Step S433, the release button 257 is detected, and as the release button 257 is operated and a release signal is generated, the photometry unit 258 measures the brightness of an object. In accordance with the photometric value, a stop value and a shutter speed are determined (Step S434). Next, similar to the panoramic photographing mode, the L and R distance distribution detection units 268 and 269 detects the object distance distributions. In accordance with the range finding information obtained by the L and R distance distribution detection units 268 and 269, a focus of an object designated with the unrepresented object selecting means is adjusted (Step S435). Next, the image pickup elements 253 and 254 are exposed at the stop value and shutter speed determined at Step S434. The signal processing unit 260 inverts the right and left image signals picked up with the image pickup elements 253 and 254, corrects the mirror images by the reflection mirrors 255 and 256 (Step S437), and adds photographing information, such as an identification signal representing a pair of image signals and a photographing condition signal, to the two image signals (Step S438). The image signals processed by the signal processing unit 260 are stored in the memory 263 (Step S439). The above operations complete a single stereoscopic photographing sequence. The reproduction operation is the same as the tenth embodiment and so the description thereof is omitted.

This embodiment provides the following advantages.

(1) The L and R distance distribution detection units 268 and 269 detect only a partial photographing area of the optical image pickup systems. However, if both the partial photographing areas are used, range finding becomes possible in most of the photographing area.

(2) Even if the warning unit 272 issues a warning, the photographing is possible by continuing to depress the release button 257 so that the photographing can be prevented from being stopped as opposed to the user intention.

In this embodiment, the predetermined value is fixed. This predetermined value may be changed in accordance with the state of an object. For example, if the detected spatial frequency of an object is low, the predetermined value may be set large. In this case, the number of panoramic photographing conditions can be increased.

In the above embodiment, the lens barrel driving unit 264 moves the lens barrels 250L and 250R so as to make always constant the ratio of the angle of the optical axes of the optical image pickup systems 251 and 252 to the photographing angle of view. This ratio may be changed by a user. In this case, the user can set the aspect ratio as desired.

In the tenth and eleventh embodiments, the compound eye camera performs panoramic synthesis. The panoramic synthesis may be performed by separate reproduction means. In this case, since a complicated signal processing circuit and the like are not necessary, the compound eye camera can be made compact.

In the tenth and eleventh embodiments, the signal processing unit 260 corrects the mirror images by the reflection mirrors 255 and 256. The image read directions of the right and left image pickup elements 253 and 254 may be inverted. In this case, the signal processing unit 260 is not necessary to perform the right and left inversion process so that the time required for one photographing sequence can be shortened.

In the tenth and eleventh embodiments, only the panoramic and stereoscopic photographing modes have been described as the photographing mode. A single eye photographing mode may be used in which only one of a plurality of optical image pickup systems is used. In this case, the compound eye camera can be used as a single eye video camera.

As described so far, according to the above embodiments, a compound eye image pickup apparatus with scarce parallax can be realized with a simple structure.

The optical image pickup systems can take different images, panoramic and stereoscopic images. At the first position of the optical image pickup systems, a panoramic image can be formed. At the second position, a stereoscopic image can be formed by using an object change, so-called parallax caused by the different photographing positions of the two optical image pickup systems.

It is not necessary to move the stops while the optical image pickup systems are moved so that the structure of the optical image pickup systems can be simplified.

Further, the structure of the stop is simple and cost effective, it is not necessary to move the stops while the lens barrels are moved, a power consumption is small, and the lens barrels can be used as protecting covers of the taking lenses.

Still further, in a compound eye image pickup apparatus using zoom lenses, panoramic synthesis with scarce object change to be caused by parallax can be performed, and the structure can be simplified because the lens barrels are not necessary to be moved while the focal lengths are changed during panoramic photographing.

Further, a user can always form a wide panoramic image without complicated operations, the structure can be simplified because it is not necessary to change the directions of the optical image pickup systems during panoramic photographing, and in addition the focal length change is possible even in panoramic photographing.

Furthermore, an aspect ratio of a synthesized panoramic image can be made almost constant even if a focal length is changed, it is possible to avoid a miss otherwise to be caused by a focal length change during panoramic photographing, and whether panoramic photographing can be made is determined more precisely in accordance with the object state.

Many widely different embodiments of the present invention may be constructed without departing from the spirit and scope of the present invention. It should be understood that the present invention is not limited to the specific embodiments described in the specification, except as defined in the appended claims.

What is claimed is:

1. A compound eye image pickup apparatus comprising:
   a plurality of optical image pickup means for condensing object light and forming an optical image on a focussing plane of each image pickup element,
   wherein said plurality of optical image pickup means are disposed such that the cross points between entrance pupils and optical axes of said plurality of optical image pickup means are generally coincident.

2. A compound eye image pickup apparatus according to claim 1, further comprising optical path changing means for changing the progressing direction of photographing light fluxes incident upon said plurality of optical image pickup means.

3. A compound eye image pickup apparatus according to claim 2, further comprising moving means for moving said plurality of optical image pickup means between first and second positions, at said first position the cross points between entrance pupils and optical axes of said plurality of optical image pickup means or the image positions of the cross points between entrance pupils and optical axes of said plurality of optical image pickup means changed by said optical path changing means being generally coincident, and at said second position the cross points between entrance pupils and optical axes of said plurality of optical image pickup means or the image positions of the cross points between entrance pupils and optical axes of said plurality of optical image pickup means changed by said optical path changing means being separated by a predetermined distance.

4. A compound eye image pickup apparatus according to claim 3, further comprising image synthesizing means for synthesizing a plurality set of image data into one continuous set of image data, the plurality set of image data being picked up with said plurality of optical image pickup means set at said first position.

5. A compound eye image pickup apparatus according to claim 3, further comprising image synthesizing means for generating a stereoscopic image signal from a plurality set of image data picked up with said plurality of optical image pickup means set at said second position.

6. A compound eye image pickup apparatus according to claim 2, wherein said optical path changing means is a mirror or a prism.

7. A compound eye image pickup apparatus according to claim 2, wherein said optical path changing means is set between said image pickup element and a lens nearest to an object among lenses of each of said plurality of optical image pickup means.

8. A compound eye image pickup apparatus according to claim 2, wherein said optical path changing means reflects or refracts a photographing light flux incident upon each of said plurality of optical image pickup means in a direction generally perpendicular to the disposal direction of said plurality of optical image pickup means.

9. A compound eye image pickup apparatus according to claim 4, further comprising correcting means for correcting trapezium distortion to be generated from a different center of the one continuous set of image data synthesized by said image synthesizing means.

10. A compound eye image pickup apparatus comprising:
a plurality of optical image pickup means for condensing object light via lenses and forming an optical image on a focussing plane of each image pickup element,
wherein the entrance pupils of said plurality of optical image pickup means are set at positions nearer to an object than a lens nearest to the object among lenses of said plurality of optical image pickup means, and disposed such that centers of gravity of the entrance pupils or the cross points between entrance pupils and optical axes of said plurality of optical image pickup means are generally coincident.

11. A compound eye image pickup apparatus according to claim 10, further comprising moving means for moving said plurality of optical image pickup means between first and second positions, at said first position the centers of gravity of the entrance pupils or the cross points between entrance pupils and optical axes of said plurality of optical image pickup means being generally coincident, and at said second position the centers of gravity of the entrance pupils or the cross points between entrance pupils and optical axes of said plurality of optical image pickup means being not coincident.

12. A compound eye image pickup apparatus according to claim 11, further comprising first stop means for controlling the amount of light incident upon each of said plurality of optical image pickup means set at said first position, and second stop means for controlling the amount of light incident upon each of said plurality of optical image pickup means set at said second position.

13. A compound eye image pickup apparatus according to claim 12, wherein said first and second stop means each include a single plate electrooptic element capable of selectively controlling light transmission through electrical control.

14. A compound eye image pickup apparatus comprising:
a plurality of optical image pickup means for condensing object light via lenses and forming an optical image on a focussing plane of each image pickup element, said plurality of optical image pickup means being capable of having a plurality of focal lengths;
moving means for moving said plurality of optical image pickup means between first and second positions, at said first position the cross points between entrance pupils and optical axes of said plurality of optical image pickup means being generally coincident, and at said second position the cross points between entrance pupils and optical axes of said plurality of optical image pickup means being not coincident; and
limiting means for limiting a focal length of each of said plurality of optical image pickup means at said first position in a predetermined range.

15. A compound eye image pickup apparatus according to claim 14, wherein said limiting means sets the shortest focal length of each of said plurality of optical image pickup means at said first position.

16. A compound eye image pickup apparatus according to claim 14, further comprising:
mode setting means for selectively setting either a panoramic photographing mode for synthesizing a plurality of images picked up with said plurality of optical image pickup means at said first position or a stereoscopic photographing mode for forming a stereoscopic image from a plurality of images picked up with said plurality of optical image pickup means at said second position; and
photographing direction changing means for changing a photographing direction of said plurality of optical image pickup means in accordance with the set photographing mode, said photographing direction changing means changing the photographing direction in accordance with the focal length when the photographing mode is set to said panoramic photographing mode.

17. A compound eye image pickup apparatus according to claim 16, wherein in said panoramic photographing mode, said photographing direction changing means changes the photographing direction so that a ratio of an angle of each photographing optical axis to an angle of view of each of said plurality of optical image pickup means is made always constant.

18. A compound eye image pickup apparatus according to claim 16, further comprising:
storage means for storing the positions of the cross points between the entrance pupils and optical axes of said plurality of optical image pickup means at a presently set focal length;
judging means for judging whether photographing can be performed properly in said panoramic photographing mode, in accordance with the positions stored in said storing means; and
warning means for issuing a warn when said judging means judges that the photographing cannot be performed properly.

19. A compound eye image pickup apparatus according to claim 18, further comprising detecting means for detecting an object distance distribution in an overlap area or a nearby area of the overlap area of the photographing area of said plurality of optical image pickup means, wherein said judging means judges whether photographing can be performed properly, in accordance with the detected object distance distribution and the positions stored in said storing means.

* * * * *